(12) United States Patent
Shimada

(10) Patent No.: US 9,789,719 B2
(45) Date of Patent: Oct. 17, 2017

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Takuya Shimada, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/181,914

(22) Filed: Jun. 14, 2016

(65) Prior Publication Data
US 2016/0368293 A1 Dec. 22, 2016

(30) Foreign Application Priority Data
Jun. 18, 2015 (JP) .................................. 2015-123012

(51) Int. Cl.
B41J 2/21 (2006.01)
H04N 1/54 (2006.01)
B41J 29/38 (2006.01)

(52) U.S. Cl.
CPC ................. *B41J 29/38* (2013.01); *H04N 1/54* (2013.01); *B41J 2/2114* (2013.01)

(58) Field of Classification Search
CPC ............ B41J 29/38; B41J 2/2114; H04N 1/54
See application file for complete search history.

(56) References Cited

U.S. PATENT DOCUMENTS 8,248,661 B2  8/2012 Wang et al.
2010/0039671 A1* 2/2010 Matusik ................. B41J 2/2132
358/2.1

FOREIGN PATENT DOCUMENTS

EP  1956825 A2  8/2008

OTHER PUBLICATIONS

Extended European Search Report issued in European Appln. No. 16001335.5, mailed Nov. 7, 2016.
Baar et al. "Printing gloss effects in a 2.5D system." Proc. SPIE. Feb. 24, 2014:90180M-1-90180M-8. vol. 9018. XP060035682.
Elkhuizen et al. "Reproducing oil paint gloss in print for the purpose of creating reproductions of Old Masters." Proc. of SPIE. Mar. 13, 2015:93980W-1-93980W-14. vol. 9398. XP060050836.
Tong et al. "Bi-Scale Appearance Fabrication." Transaction on Graphics. 2013. vol. 32, No. 4, Article 145.

* cited by examiner

*Primary Examiner* — Jason Uhlenhake
(74) *Attorney, Agent, or Firm* — Rossi, Kimms & McDowell LLP

(57) ABSTRACT

An image processing apparatus of the present embodiment generates image data representing an image which reproduces anisotropy. The image processing apparatus of the present embodiment has a receiving unit configured to receive an input of image data having anisotropy information and a generating unit configured to generate a signal corresponding to a printing material based on the anisotropy information. The generating unit generates an ejection signal so that a first area and a second area have different smoothnesses, the first area being formed by the printing material adjacently ejected in a first direction, the second area being formed by the printing material adjacently ejected in a second direction, the second direction being different from the first direction.

16 Claims, 19 Drawing Sheets

800

| gloss | haze | g<br>(TOTAL AMOUNT OF REFLECTED LIGHT<br>NEAR SPECULAR REFLECTION DIRECTION) |
|---|---|---|
| 20 | 10 | 40 |
| 30 | 10 | 50 |
| 40 | 10 | 60 |
| 50 | 10 | 70 |
| . | . | . |
| . | . | . |
| . | . | . |
| 20 | 20 | 60 |
| . | . | . |
| . | . | . |
| . | . | . |
| 50 | 30 | 110 |

FIG.8

| h2 | h1 | (0,0) | (0,1) | ... | (0,15) | (1,0) | ... | (7,7) | ... | (15,15) |
|---|---|---|---|---|---|---|---|---|---|---|
| 0.0 | 0.0 | 0 | 0 | ... | 0 | 0 | ... | 0 | ... | 0 |
| 0.2 | 0.0 | 0 | 0 | ... | 0 | 0 | ... | 4 | ... | 0 |
| 0.4 | 0.0 | 0 | 0 | ... | 0 | 0 | ... | 8 | ... | 0 |
| . | . | . | . | | . | . | | . | | . |
| . | . | . | . | | . | . | | . | | . |
| 0.2 | 0.2 | 0 | 0 | ... | 0 | 0 | ... | 4 | ... | 0 |
| 0.4 | 0.2 | 0 | 0 | ... | 0 | 0 | ... | 8 | ... | 0 |
| . | . | . | . | | . | . | | . | | . |
| . | . | . | . | | . | . | | . | | . |
| 0.8 | 0.8 | 0 | 0 | ... | 0 | 0 | ... | 16 | ... | 0 |

IMAGE PROCESSING APPARATUS, IMAGE PROCESSING METHOD, AND STORAGE MEDIUM

BACKGROUND OF THE INVENTION

Field of the Invention

The present invention relates to an image processing apparatus for generating image data representing an image which reproduces anisotropy, an image processing method, and a storage medium storing a program for achieving them.

Description of the Related Art

Recently, research for the improvement of designs of a print image has progressed. For example, Xin Tong et al., Bi-Scale Appearance Fabrication, Transaction on Graphics, Vol. 32, No. 4, Article 145, 2013 discloses a printing method for printing an image representing anisotropy, such as different gloss or color, by forming a structure having a fine inclination on a print medium and by creating different degrees of scattering of light reflected on a surface of the structure depending on an illumination direction.

SUMMARY OF THE INVENTION

In the above printing method of the Xin Tong et al., Bi-Scale Appearance Fabrication, Transaction on Graphics, Vol. 32, No. 4, Article 145, 2013, an image representing anisotropy, such as different gloss or color, is printed by forming a structure having a fine inclination on a print medium and creating different degrees of scattering of light reflected on a surface of the structure depending on an illumination direction. Accordingly, if color is applied to the structure with color ink and the like, characteristics of the ink may reduce a difference in degrees of scattering of light depending on an illumination direction, causing a problem of reduction of anisotropy of a print image.

The image processing apparatus according to the present invention is an image processing apparatus for generating image data representing an image which reproduces anisotropy, the image processing apparatus including: a receiving unit configured to receive an input of image data having anisotropy information; and a generating unit configured to generate a signal corresponding to a printing material based on the anisotropy information, wherein the generating unit generates the signal so that a first area and a second area have different smoothnesses, the first area being formed by the printing material adjacently ejected in a first direction, the second area being formed by the printing material adjacently ejected in a second direction, the second direction being different from the first direction.

Further features of the present invention will become apparent from the following description of exemplary embodiments (with reference to the attached drawings).

BRIEF DESCRIPTION OF THE DRAWINGS

FIG. 8 is a schematic view showing an example of a conversion table of a total reflected light amount according to the first embodiment;

FIG. 9 is a schematic view showing an example of a shape generation table according to the first embodiment;

DESCRIPTION OF THE EMBODIMENTS

Figure 1A:
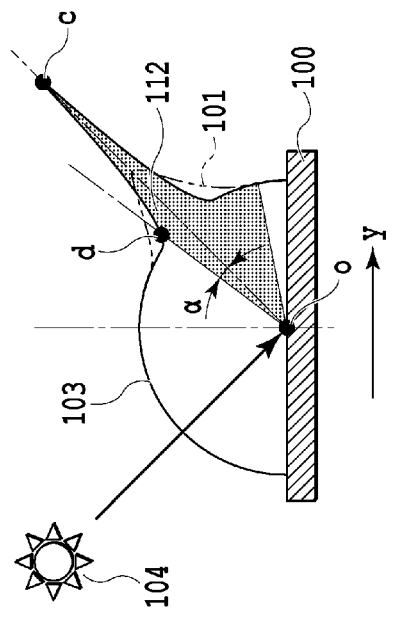
FIG. 1A to FIG. 1D are schematic views illustrating anisotropy.

Embodiments for carrying out the present invention will be described with reference to the attached drawings. However, elements described in the embodiments are only exemplary and are not intended to limit the scope of the present invention. It should be noted that the same reference numeral refers to the same element in the following description.

[First Embodiment]

Anisotropy

First, anisotropy will be described. FIG. 1A to FIG. 1D are schematic views illustrating anisotropy according to the present embodiment. FIG. 1A shows a reflection characteristic in an x direction of a sample 100 which exhibits anisotropy, and a curve 101 shows a reflection intensity in each direction when incident light 102 illuminates toward a point o. For example, the length of a line oa from the point o to a point a on the curve 101 shows a reflection intensity of light reflected from the point o toward the point a. The direction toward the point a at which a reflection intensity from the point o becomes a maximum is the direction of specular reflection, and the direction from the point o toward a point b on the curve 101 is a direction shifted from the direction of specular reflection by $\alpha$ degrees. At this time, the reflection intensity from the point o to the point a is also referred to as a specular reflection intensity, and the reflection intensity from the point o to the point b is also referred to as a reflection haze.

Figure 1B:
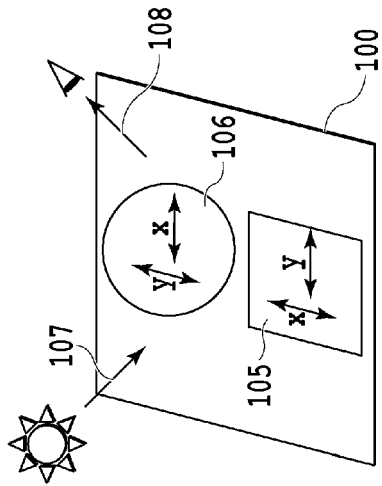

FIG. 1B shows a reflection characteristic in a y direction of the sample 100 which exhibits anisotropy, and a curve 103 shows a reflection intensity in each direction when incident light 104 illuminates toward the point o. Note that the y direction is orthogonal to the x direction. Like FIG. 1A, the length of a line oc from the point o to a point c on the curve 103 shows a reflection intensity of light reflected from the point o toward the point c. The direction toward the point c at which a reflection intensity from the point o becomes a maximum is the direction of specular reflection, and the direction from the point o toward a point d on the curve 103 is a direction shifted from the direction of specular reflection by α degrees. At this time, the reflection intensity from the point o to the point c is also referred to as a specular reflection intensity, and the reflection intensity from the point o to the point d is also referred to as a reflection haze.

The specular reflection intensity in the x direction shown by the length of the line oa in FIG. 1A is lower than the specular reflection intensity in the y direction shown by the length of the line oc in FIG. 1B. The reflection haze in the x direction shown by the length of the line ob in FIG. 1A is higher than the reflection haze in the y direction shown by the length of the line od shown in FIG. 1B. As described, a property that the reflection intensity corresponding to incident light in the direction of specular reflection and near the direction of specular reflection changes depending on the direction of the incident light and an observation direction is referred to as anisotropy. A high-contrast anisotropy means that a reflection intensity corresponding to the incident light greatly changes depending on the direction of the incident light and the observation direction.

Figure 1C:
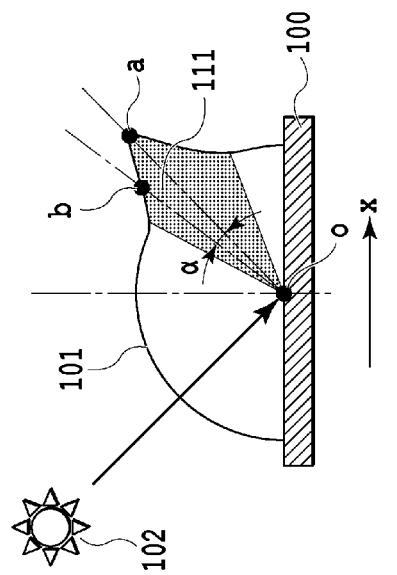
Figure 1D:
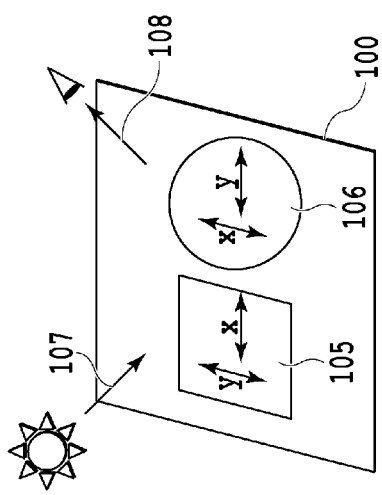

FIG. 1C and FIG. 1D show examples of the sample 100 including two areas having different reflection characteristics. Each of a square area 105 and a round area 106 has different reflection characteristics in the x direction and the y direction. More specifically, the square area 105 shown in FIG. 1C has the reflection characteristic shown in FIG. 1A and the round area 106 shown in FIG. 1C has the reflection characteristic shown in FIG. 1B. Meanwhile, the square area 105 shown in FIG. 1D has the reflection characteristic shown in FIG. 1B, and the round area 106 shown in FIG. 1D has the reflection characteristic shown in FIG. 1A. That is, if rotated by 90 degrees, the sample 100 shown in FIG. 1C corresponds to the sample 100 shown in FIG. 1D.

FIG. 1C schematically shows a positional relationship among a direction 107 of incident light, the sample 100, and an observation direction 108. In FIG. 1C, if the direction 107 of the incident light and the observation direction 108 are in the relation of specular reflection, the round area 106 is viewed as lighter, with a higher gloss, than the square area 105. However, if the observation direction 108 is shifted by α degrees from the direction of specular reflection, the square area 105 is viewed as lighter, with a higher gloss, than the round area 106. That is, if the sample is viewed from a different position, a light area and a dark area are reversed.

FIG. 1D schematically shows a positional relationship among the direction 107 of the incident light, the sample 100 rotated by 90 degrees from the position of the sample 100 shown in FIG. 1C, and the observation direction 108. If the direction 107 of the incident light and the observation direction 108 are in the relation of specular reflection, the square area 105 shown in FIG. 1D is viewed as lighter, with a higher gloss, than the round area 106. That is, if the direction of the sample is changed, a light area and a dark area are reversed. As described above, if the sample is viewed from a different position or the direction of the sample is changed, a light area and a dark area are reversed in the sample exhibiting anisotropy. The image printing apparatus according to the present embodiment generates image data representing an image having such characteristics.

Figure 2C:
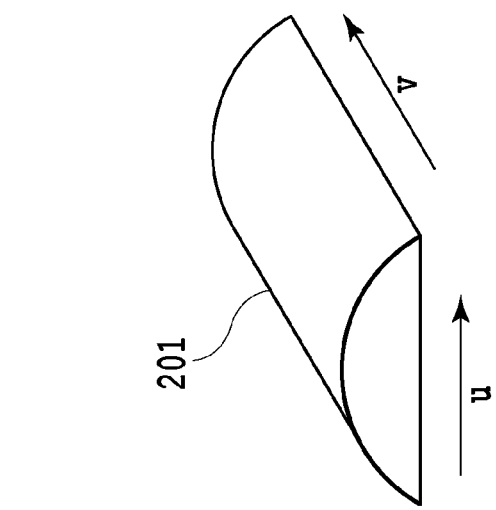
FIG. 2A to FIG. 2C are schematic views for explaining a mechanism for controlling anisotropy by a structure having a surface roughness shape.
Figure 2B:
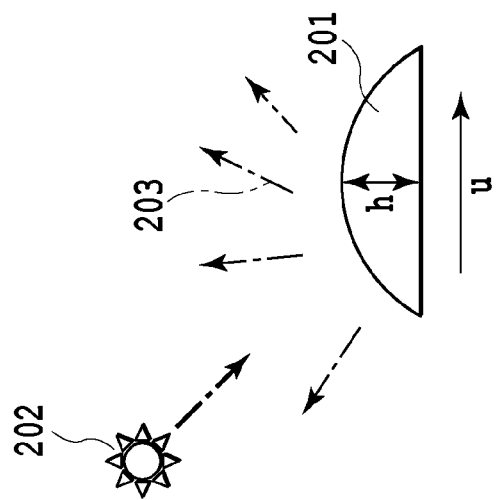
Figure 2A:
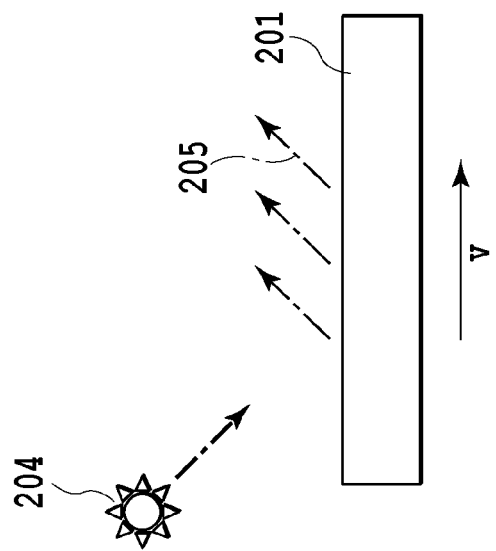

Next, a description will be given of a mechanism for controlling anisotropy by surface roughness. FIG. 2A to FIG. 2C are schematic views for explaining a mechanism for controlling anisotropy by surface roughness. FIG. 2A is a view showing an example of a surface roughness shape of a structure 201 representing anisotropy. FIG. 2B shows a cross section parallel to a u direction of the structure 201, and FIG. 2C shows a cross section parallel to a v direction of the structure 201. As shown in FIG. 2B, the cross section parallel to the u direction is arc-shaped, and if the structure 201 is irradiated with light 202 in an arrow direction, surface reflected light 203 is scattered. The degree of scattering is related to a radius of curvature of an arc and can be controlled by a height h, for example. As the height h decreases, the degree of scattering decreases, and as the height h increases, the degree of scattering increases. Meanwhile, as shown in FIG. 2C, the cross section parallel to the v direction is rectangular, and if the structure 201 is irradiated with light 204 in an arrow direction, surface reflected light 205 is not scattered. By printing the structure 201 having a roughness shape as shown in FIG. 2A on a print medium such as print paper, it is possible to have different degrees of scattering of light depending on an illumination direction. The image printing apparatus according to the present embodiment prints an image representing anisotropy by laminating and printing a roughness forming material such as a UV-curable ink and forming the structure 201 having a roughness shape as shown in FIG. 2A on a print medium.

Next, a description will be given of a printing method of an image representing a high-contrast anisotropy. An image representing a high-contrast anisotropy may be obtained by printing on a print medium the structure 201 having a large difference between a degree of scattering of the surface reflected light 203 in the u direction and a degree of scattering of the surface reflected light 205 in the v direction shown in FIG. 2A to FIG. 2C. That is, the degree of scattering of the surface reflected light 203 in the u direction is made as high as possible and the degree of scattering of the surface reflected light 205 in the v direction is made as low as possible in FIG. 2A to FIG. 2C. To increase the degree of scattering of the surface reflected light, the height h of the structure 201 of FIG. 2B may be increased, but in general, it is difficult to form the structure 201 with a great height h on the print medium. Even if such a structure can be formed, the resulting structure 201 may become unnaturally conspicuous.

Figure 3A:
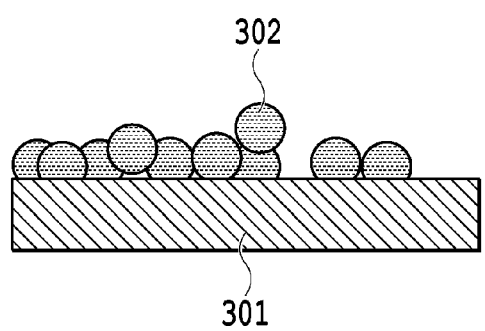
FIG. 3A and FIG. 3B are schematic views for explaining a surface structure of a print medium.
Figure 3B:
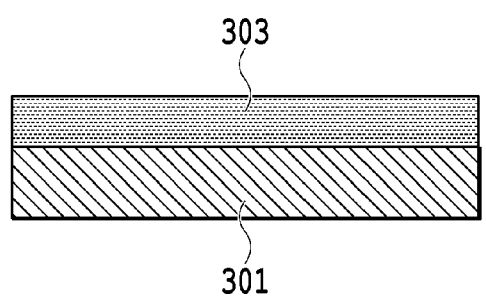

In general, ink landed on a print medium is laminated, and fine roughness is formed on the print medium. At this time, if the ink lands adjacently in a short period of time on the print medium, the ink merges as liquid, thereby forming a smooth surface on the print medium. FIG. 3A is a schematic view for explaining fine roughness on the surface of the print medium. As shown in FIG. 3A, an ink droplet landed on a print medium 301 is laminated, and a dot 302 forms fine roughness on the surface of the print medium 301. The fine roughness formed on the surface of the print medium 301 causes the surface reflected light to be scattered. Such a fine roughness area formed on the surface of the print medium 301 is an area having a low smoothness. As shown in FIG. 3B, however, if ink droplets land adjacently in a short period of time on the print medium 301, the ink droplet merges with another, thereby forming a smooth ink layer 303 on the surface of the print medium 301. The smooth ink layer 303 can reduce scattering of the surface reflected light. Such a smooth area formed on the surface of the print medium 301 is an area having a high smoothness.

A conventional image forming apparatus forms a structure having a shape as shown in FIG. 2A on a print medium to have different levels of light scattering according to an illumination direction and forms an image representing anisotropy. However, an ink droplet landed on the surface of the structure forms fine roughness, and the formed fine roughness causes the surface reflected light to be scattered in the v direction (FIG. 2A and FIG. 2C). As a result, a printed image has a low-contrast anisotropy. According to the present embodiment, to print an image reproducing a high-contrast anisotropy, control is performed so that an ink layer having a high smoothness is formed in a direction in which scattering of the surface reflected light is preferably decreased, and an area having a low smoothness is formed by fine roughness in a direction in which scattering of the surface reflected light is preferably increased. More specifically, the image printing apparatus according to the present embodiment prints an image reproducing a high-contrast anisotropy by performing pass separation based on anisotropy information and controlling a smooth area printed in the same pass to be flatter as the degree of scattering of the surface reflected light increases.

(Schematic configuration of an image printing apparatus)

Figure 4:
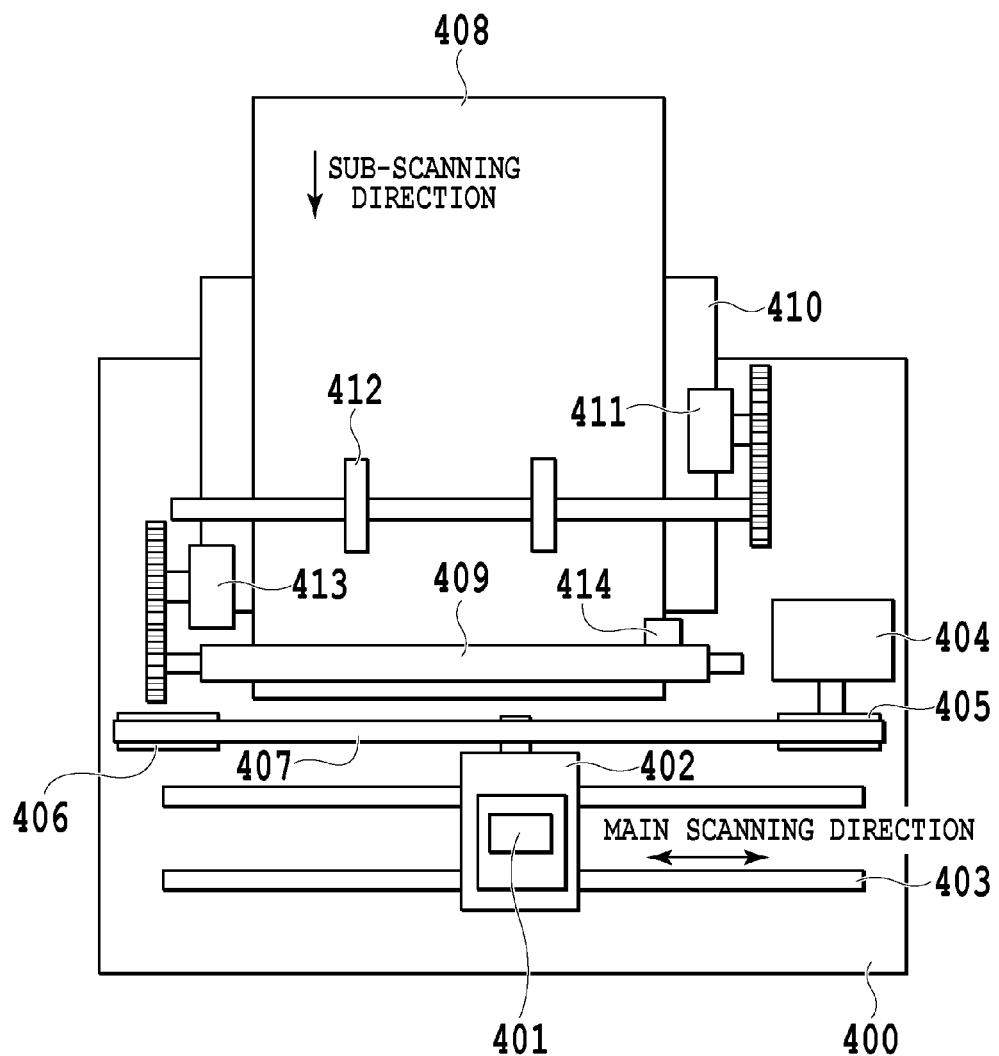
FIG. 4 is a block diagram showing a schematic configuration of an image printing unit according to a first embodiment.

FIG. 4 is a block diagram for explaining a schematic configuration of an image printing unit 400 of an image printing apparatus 1 according to the present embodiment. The image printing unit 400 is an ink jet printer performing image printing by using ink. A head cartridge 401 has a print head having a plurality of ejection ports and an ink tank for supplying ink to the print head. The head cartridge 401 is positioned by a carriage 402 and replaceably mounted, and the carriage 402 can be reciprocated along a guide shaft 403. More specifically, the carriage 402 has a main scanning motor 404 as a driving source and is driven by a driving mechanism including a motor pulley 405, a driven pulley 406, and a timing belt 407, and the position and the movement of the carriage 402 are controlled. It should be noted that movement along the guide shaft 403 of the carriage 402 is referred to as "main scanning" and a moving direction is referred to as "a main scanning direction." A print medium 408 such as print paper is loaded into an auto sheet feeder (hereinafter referred to as "ASF") 410. In printing an image, a pickup roller 412 is rotated via a gear by driving of a paper feed motor 411, and the print medium 408 is separated one by one from the ASF 410 and fed. Further, by the rotation of a conveying roller 409, the print medium 408 is conveyed to a print start position opposite to an ejection port surface of the head cartridge 401 on the carriage 402. The conveying roller 409 has a line feed (LF) motor 413 as a driving source and is driven via the gear. Determination on whether the print medium 408 has been fed and confirmation of a paper feed position take place when the print medium 408 passes a paper end sensor 414. The head cartridge 401 mounted on the carriage 402 includes an ink tank which stores ink as a printing material, a print head which causes ink supplied from the ink tank to be ejected in response to an ejection signal, and an ultraviolet radiation device. The print head is held so that the ink ejection port surface protrudes downward from the carriage 402 to be in parallel with the print medium 408. Six types of inks, for example, are used: yellow (Y), magenta (M), cyan (C), black (K), a roughness forming material (W), and a gloss adjusting material (S). Color inks of Y, M, C, and K are pigment inks which have substantially the same refractive index as that of the print medium 408, for example, and color is reproduced according to the combination of four types of inks. The roughness forming material is, for example, a white ultraviolet-curable ink. The roughness forming material landed on the print medium 408 cures when irradiated with ultraviolet rays by the ultraviolet radiation device and forms a structure having a roughness shape on the surface of the print medium 408. Forming the structure on the print medium 408 can control the degree of scattering of the surface reflected light according to an illumination direction and print an image reproducing anisotropy. The gloss adjusting material is, for example, a transparent ink having a refractive index that is lower than those of color inks of Y, M, C, and K. Printing a gloss adjusting material on the top surface of the image can control an intensity of reflected light on the surface.

(Image printing operation)

Next, an image printing operation will be described. First, after the print medium 408 is conveyed to a predetermined print start position, the carriage 402 moves above the print medium 408 along the guide shaft 403, and ink is ejected from the ejection ports of the print head during the movement of the carriage 402. Then, if the carriage 402 moves to one end of the guide shaft 403, the conveying roller 409 conveys, by a predetermined amount, the print medium 408 in a direction perpendicular to the scanning direction of the carriage 402. The conveyance of the print medium 408 is referred to as "paper feed" or "sub-scanning" and a conveying direction is referred to as "a paper feed direction" or "a sub-scanning direction." After the conveyance of the print medium 408 by the predetermined amount, the carriage 402 moves again along the guide shaft 403. In this manner, repeating the scanning of the carriage 402 of the print head and paper feed, an image is printed across the print medium 408. The image printing unit 400 according to the present embodiment prints an image on the print medium 408 through two steps: forming a structure having a roughness shape and printing color and gloss. The structure is formed by laminating and printing a roughness forming material W. Every time the printing of one layer is completed, the conveying roller 409 is rotated backward to return the print medium 408 to the print start position before going on to the next layer. After the printing of all layers is completed and the formation of the structure is completed, printing of color and gloss is started. The printing of color and gloss according to the present embodiment is performed by 8-pass printing in which scanning of the print head is performed eight times on the same line of the print medium 408.

Figure 5:
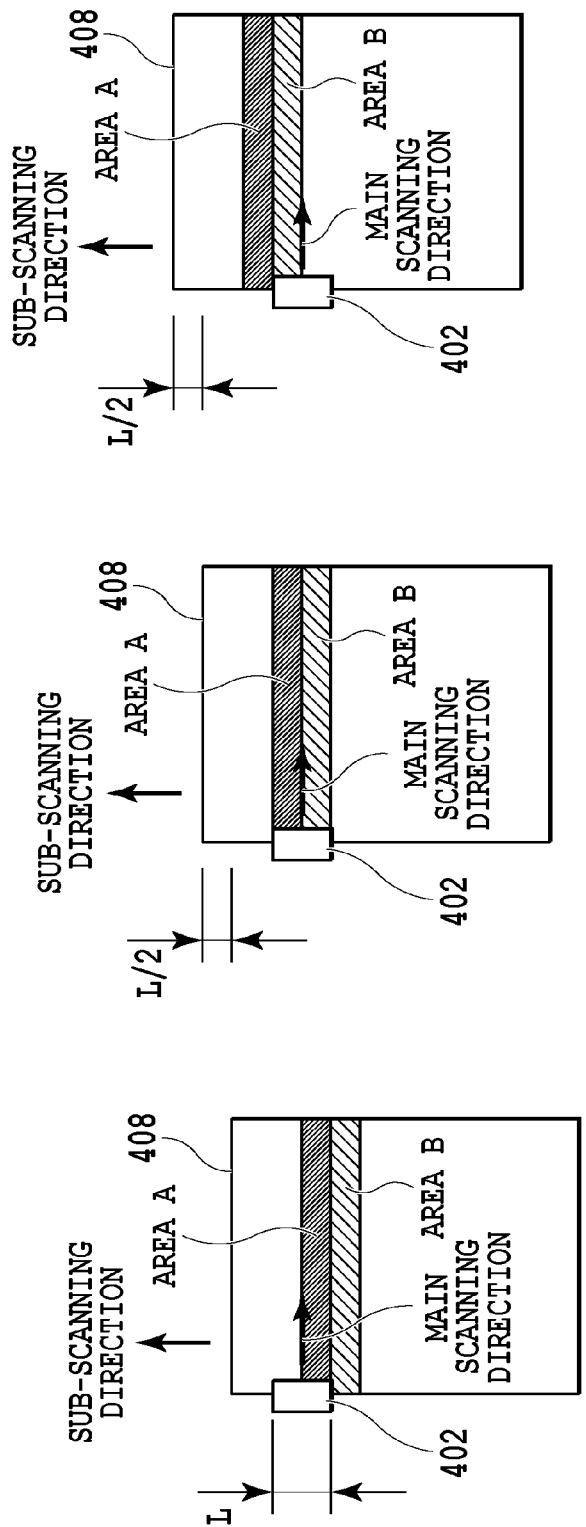
FIG. 5A to FIG. 5C are schematic views for explaining multi-pass printing according to the first embodiment.

FIG. 5A to FIG. 5C are schematic views for explaining a multi-pass printing operation by the image printing unit 400. In the schematic views of FIG. 5A to FIG. 5C, an operation of 2-pass printing is shown in which scanning of the print head is performed twice on the same line of the print medium 408 to print an image. As shown in FIG. 5A to FIG. 5C, in the case of the 2-pass printing, image printing is performed corresponding to a width L of the print head by main scanning of the carriage 402, and every time printing of one line is finished, the print medium 408 is conveyed in a sub-scanning direction by a distance L/2. For example, an area A is printed by $M^{th}$ main scanning (FIG. 5A) and $(M+1)^{th}$ main scanning (FIG. 5B) of the print head, and an area B is printed by $(M+1)^{th}$ main scanning (FIG. 5B) and $(M+2)^{th}$ main scanning (FIG. 5C) of the print head. In n-pass printing in which an image is formed by performing main scanning of the print head n times on the same line of the print medium 408, every time printing of one line is finished, for example, the print medium 408 is conveyed in a sub-scanning direction by a distance L/n. In the case of 8-pass printing, eight kinds of image data consisting of ejection signals of printing materials, for example, are prepared. In each scanning of the print head, the printing material is ejected based on the image data corresponding to the number of scannings. In the $M^{th}$ main scanning of the print head, given that a remainder in the division of M by 8 is K, the printing material is ejected based on $(K+1)^{th}$ image data. In the following description, printing in an $n^{th}$ pass (n: 1 to 7) means printing by main scanning, where a value K is n, and printing in the $8^{th}$ pass means printing by main scanning, where a value K is 0. Further, pass separation means processing of determining in which pass, from the $1^{st}$ pass to the $8^{th}$ pass, a target pixel should be printed. The determined pass number is referred to as a printing pass for the target pixel. It should be noted that printing of a structure for each layer is performed by one pass.

(Hardware configuration)

Figure 6:
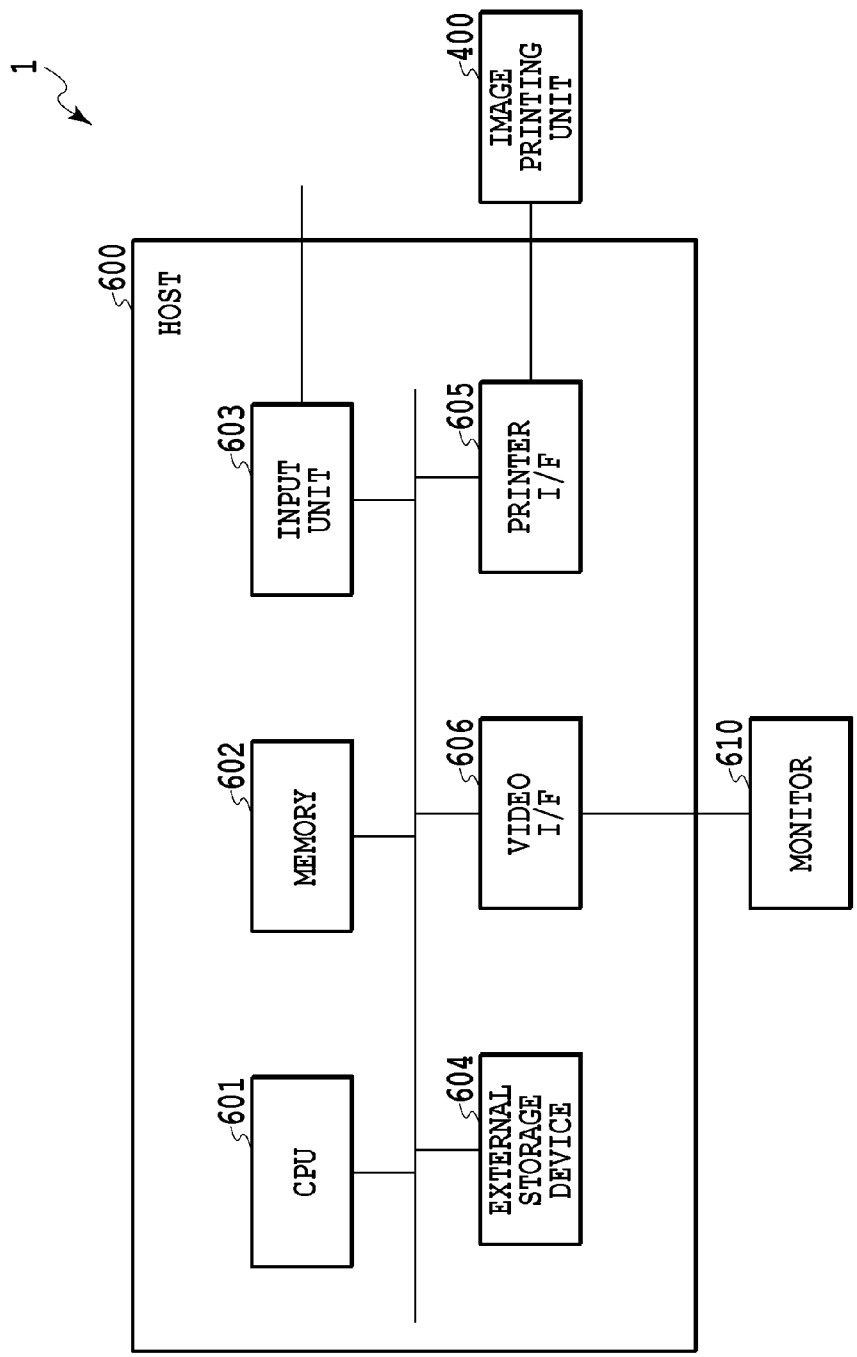
FIG. 6 is a block diagram showing a hardware configuration of an image printing apparatus according to the first embodiment.

FIG. 6 is a block diagram showing a hardware configuration which mainly serves for image processing in the image printing apparatus 1. In FIG. 6, a host 600 which functions as an image processing unit is a computer, for example, and has a microprocessor (CPU) 601 and a memory 602 such as a random access memory. The host 600 also has an input unit 603 such as a keyboard and an external storage device 604 such as a hard disk drive. The host 600 further has a communication interface (hereinafter referred to as "a printer I/F") 605 for communication with the image printing unit 400 and a communication interface (hereinafter referred to as "a video I/F") 606 for communication with a monitor 610. The CPU 601 executes various kinds of processing according to programs stored in the memory 602 and performs image processing of the present embodiment, in particular, generation of a pass separation signal, generation of a pass mask, and generation of an ejection signal. These programs are stored in the external storage device 604 or provided by an external information processing device (not shown). The host 600 outputs various kinds of information to the monitor 610 via the video I/F 606 and inputs various kinds of information through the input unit 603. The host 600 is connected to the image printing unit 400 via the printer I/F 605 to transmit the image-processed ink ejection signal to the image printing unit 400 for printing and receive various kinds of information from the image printing unit 400.

(Image printing procedure)

Figure 7:
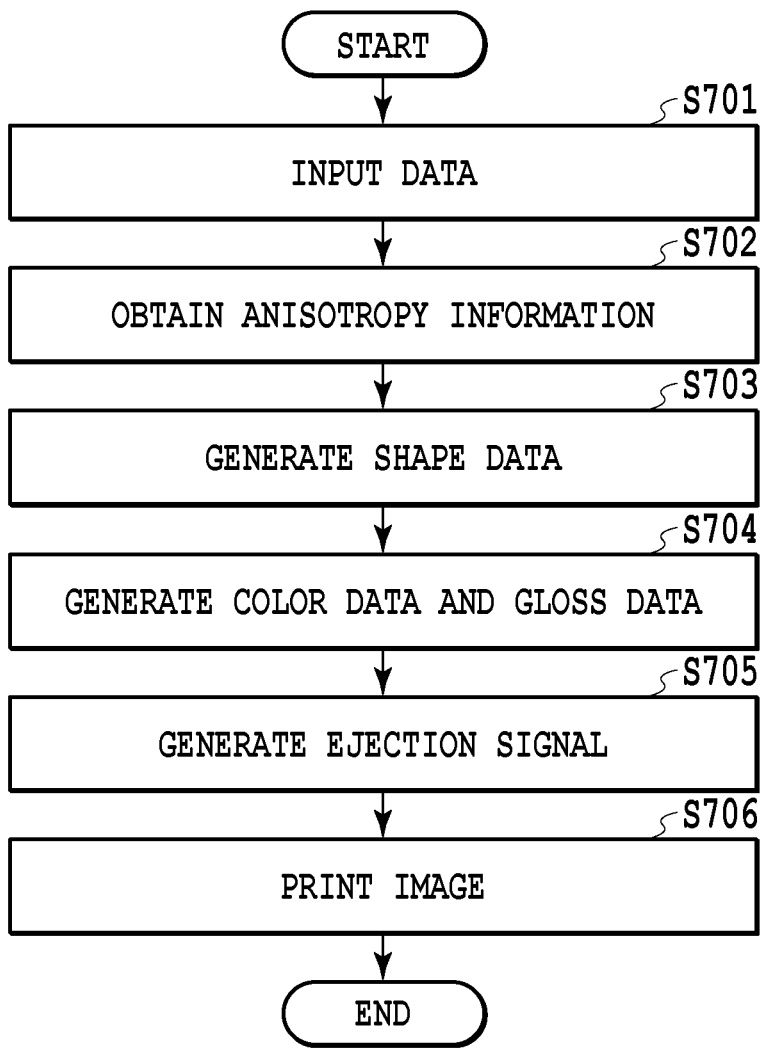
FIG. 7 is a flow chart showing an image printing procedure according to the first embodiment.

FIG. 7 is a flow chart showing an image printing procedure of the image printing apparatus 1 according to the present embodiment. The processing through the flow chart of FIG. 7 is executed by the CPU 601 which loads a program code stored in the external storage device 604 into the memory 602.

In S701, image data to be printed is inputted. The image printing apparatus 1 of the present embodiment inputs image data including not only RGB color signals, but also a signal specifying anisotropy. The image data to be inputted includes a signal φ specifying an azimuth angle at which a reflection intensity of specular reflected light corresponding to incident light becomes a maximum, a signal gloss1 specifying the reflection intensity of the specular reflected light in a direction of an azimuth angle φ, and a signal haze1 specifying an intensity of reflected light near the specular reflection direction. The image data to be inputted further includes a signal gloss2 specifying the reflection intensity of the specular reflected light corresponding to the incident light in a direction orthogonal to the azimuth angle φ and a signal haze2 specifying an intensity of reflected light near the specular reflection direction. The signal φ is, for example, an angle defined by the y direction in FIG. 1A to FIG. 1D and an X axis direction of the inputted image data defined by coordinates on the XY plane, and gloss1 and haze1 respectively correspond to the length of the line oc and the length of the line od shown in FIG. 1B. Likewise, gloss2 and haze2 respectively correspond to the length of the line oa and the length of the line ob shown in FIG. 1A. In the present embodiment, an angle α defined by cod in FIG. 1B and an angle α defined by aob in FIG. 1A are 2 degrees, for example. A value of gloss1 is equal to or greater than a value of gloss2. A value of haze1 is equal to or less than a value of haze2.

In S702, the CPU 601 obtains anisotropy information from the inputted image data. The anisotropy information of the present embodiment corresponds to the signal φ, a signal h1, and a signal h2. The signal φ specifies an azimuth angle at which a reflection intensity of specular reflected light corresponding to incident light becomes a maximum, and can be obtained from the inputted image data. Values of h1 and h2 are respectively derived by the division of haze1 and haze2 specifying an intensity of reflected light near the specular reflection direction by a total amount g0 of reflected light near the specular reflection direction and the normalization of the result. The total amount g0 of reflected light of the present embodiment is an integral of an intensity of reflected light in a direction in which an angle defined with respect to the specular reflection direction is, for example, 10 degrees or smaller, and corresponds to values specified by areas 111 and 112 in FIG. 1A and FIG. 1B. The total amount g0 of reflected light varies depending on the material of the surface on which the incident light is reflected. In the present embodiment, h1 and h2 indicate degrees of scattering of the surface reflected light. As the value increases, the degree of scattering increases. As the value decreases, the degree of scattering decreases. That is, as a difference between h1 which indicates the degree of scattering of the surface reflected light in the y direction in FIG. 1B and h2 which indicates the degree of scattering of the surface reflected light in the x direction in FIG. 1A increases, anisotropy is determined to have higher contrast. Details will be described with reference to FIG. 10. The same value of h1 and h2 indicates a similar degree of scattering regardless of the material of the surface.

The total amount g0 of reflected light is derived by a known interpolation method with reference to a conversion table based on gloss1, haze1, gloss2, and haze2 obtained from the image data inputted in S701. FIG. 8 is a schematic view showing an example of a conversion table 800 of a total reflected light amount according to the present embodiment. The conversion table 800 of a total reflected light amount is a table which describes a signal specifying the corresponding total amount g0 of specular reflected light in association with a discrete value of gloss, which is a signal relating to a reflection intensity of specular reflected light, and haze, which is a signal relating to an intensity of reflected light near the specular reflection direction. The CPU 601 refers to the conversion table 800 of a total reflected light amount and obtains a total amount g of reflected light corresponding to a combination of gloss1 and haze1 and a total amount g of reflected light corresponding to a combination of gloss2 and haze2 by interpolation, and an average of them is set as a signal g0. Although an intensity of reflected light near the specular reflection direction changes depending on whether the surface which is irradiated with light is roughness or smooth, a total amount of reflected light itself does not substantially change. Meanwhile, a total amount of reflected light near the specular reflection direction changes depending on the material of the surface which is irradiated with light. The image printing apparatus 1 of the present embodiment controls an amount of a gloss adjusting material S based on the total amount g0 of reflected light so as to reproduce the total amount of reflected light near the specular reflection direction. It should be noted that regardless of the above value, the total amount g0 of reflected light may be a total amount of reflected light near the specular reflection direction corresponding to a combination of an average of gloss1 and gloss2 and an average of haze1 and haze2. The image printing apparatus 1 of the present embodiment forms a structure having a roughness shape based on ϕ, h1, and h2 on a print medium and controls a time difference between ejections of a printing material on the structure, so that an image reproducing a high-contrast anisotropy is printed.

In S703, the CPU 601 generates structure shape data based on the anisotropy information. The structure shape data of the present embodiment is data specifying the number of times the roughness forming material is laminated on a plane of, for example, 16 pixels in height and 16 pixels in width. First, the CPU 601 refers to a shape generation table 900 and generates the structure shape data from h1 and h2. FIG. 9 is a schematic view showing an example of the shape generation table 900. The shape generation table 900 is a table which describes a combination of h1 and h2 in association with the number of times the roughness forming material is laminated in each block on the plane of 16 pixels in height and 16 pixels in width. In the shape generation table 900, (a,b) indicates the number of times the roughness forming material is laminated on a pixel at column a and row b on the plane of 16 pixels in height and 16 pixels in width. The number of times the roughness forming material is laminated corresponding to any combination of h1 and h2 can be calculated by a known interpolation method.

Figure 10:
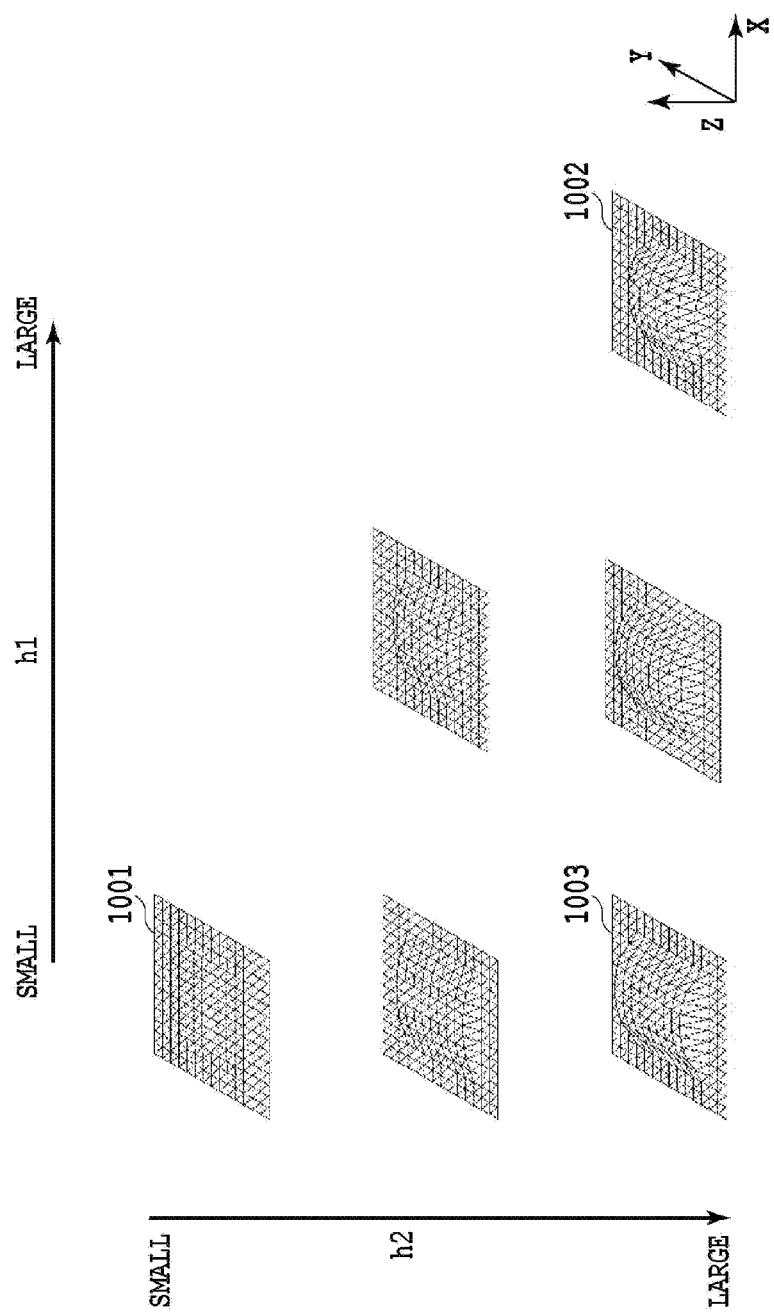
FIG. 10 is a schematic view showing an example of a shape of a structure according to the first embodiment.

FIG. 10 is a schematic view showing an example of a shape of a structure formed based on the structure shape data. In FIG. 10, an X direction, a Y direction, and a Z direction respectively show a horizontal direction, a vertical direction, and a height direction in a front view. In a case where values of h1 and h2 are small, a degree of scattering of surface reflected light is decreased by forming a structure having a flat shape. For example, the image printing apparatus 1 forms a structure 1001 having a flat shape on a print medium based on small values of h1 and h2. In a case where values of h1 and h2 are large, a degree of scattering of surface reflected light is increased by forming a structure having a shape with a large radius of curvature. For example, the image printing apparatus 1 forms a structure 1002 having a shape with a large radius of curvature on a print medium based on large values of h1 and h2. In a case where a difference between h1 and h2 is large, anisotropy is reproduced by forming a structure having a shape with different radii of curvature between the X direction and the Y direction. For example, the image printing apparatus 1 forms a structure 1003 having a shape with different radii of curvature between the X direction and the Y direction on a print medium based on a small value of h1 and a large value of h2. Then, a predetermined computation is added to the structure shape data, and structure shape data for specifying a structure rotated by ϕ degrees on the XY plane in FIG. 10 is further generated. Then, the CPU 601 generates an ejection signal W(n) of the roughness forming material W from the number of times the roughness forming material is laminated in the structure shape data. W(n) represents an ejection signal of the roughness forming material for forming an $n^{th}$ layer.

In S704, the CPU 601 generates color data and gloss data. The image printing apparatus 1 of the present embodiment reproduces color on the print medium by using four types of printing materials, C, M, Y, and K, and reproduces gloss on the print medium by using the gloss adjusting material S. The color data is data specifying arrangement of the printing materials C, M, Y, and K. The color data of the present embodiment is generated through the following procedure. First, color signals RGB are obtained from the image data inputted in S701. Then, with reference to the color conversion table, the color signals RGB are converted into color signals R',G',B' which are dependent on the printing apparatus. The color conversion table is a table which describes the color signals R',G',B' corresponding to discrete color signals RGB, and each color signal is converted by using a known three-dimensional look-up table. The above color conversion allows color specified by the inputted color signals to be mapped into color reproducible in the image printing apparatus 1. A plurality of color conversion tables, such as for minimizing a color difference, giving a higher priority to chroma, and giving a higher priority to lightness, may be stored in advance in the memory 602 and the color conversion table to be used may be switched depending on a purpose. A table to be used may be determined based on user's selection from the plurality of color conversion tables. Then, with reference to a color separation table, the color signals R',G',B' are converted into signals C,M,Y,K specifying amounts of printing materials. The color separation table is a table which describes printing material signals C,M,Y,K corresponding to discrete color signals R',G',B', and each color signal is converted by using a known three-dimensional look-up table. To match the structure shape data with a resolution, one pixel in the inputted image data is divided into 16 blocks in height and blocks in width, and the same signals C,M,Y,K are associated with all of 256 blocks in total. Then, halftone processing is applied to each type of printing material, and the printing material signals C,M,Y,K are converted into binary signals C',M',Y',K' indicating whether to arrange a printing material on each block. The binary signals C',M',Y',K' indicate, for example, arrangement of the printing material if a value is 1, and no arrangement of the printing material if a value is 0. For the halftone processing, a known error diffusion method or ordered dither method can be used.

The gloss data is data specifying arrangement of the gloss adjusting material S. The gloss data of the present embodiment is generated through the following procedure. First, with reference to a gloss conversion table, a signal g0 specifying a total amount of reflected light near the specular reflection direction is converted into a gloss signal g0' which is dependent on the printing apparatus. The gloss conversion table is a table which describes the signal g0 and the gloss signal g0' corresponding to a discrete value of color signals R',G',B', and the gloss signal is converted by using a known interpolation method. The above conversion allows the total amount of reflected light near the specular reflection direction indicated by the signal g0 to be mapped into a reproducible range in the image printing apparatus 1. Then, with reference to a gloss separation table, the gloss signal g0' is converted into a signal S specifying the amount of a gloss adjusting material. The gloss separation table is a table which describes a printing material signal S corresponding to a discrete gloss signal g0', and the conversion from the gloss signal g0' into the printing material signal S is performed by using a known interpolation method. To match the structure shape data with a resolution, one pixel in the inputted image data is divided into 16 blocks in height and 16 blocks in width, and the same signal S is associated with all of 256 blocks in total. Then, halftone processing is applied to the printing material signal S, and the printing material signal S is converted into a binary signal S' indicating whether to arrange a printing material on each block. The binary signal S' indicates, for example, arrangement of the printing material if a value is 1, and no arrangement of the printing material if a value is 0. For the halftone processing, a known error diffusion method or ordered dither method can be used.

In S705, the CPU 601 performs pass separation on the color data and gloss data consisting of binary signals C',M', Y',K',S' and generates ejection signals C",M",Y",K",S" of the printing materials. The pass separation of the present embodiment is performed by using a pass mask generated based on anisotropy information. In this example, the pass mask is binary data generated one for each pass. In the present embodiment, eight pieces of binary data are generated corresponding to eight passes. The pass separation is processing of calculating an OR between a binary signal of each printing material and each pass mask and generating an ejection signal corresponding to each pass. For example, based on the binary signal C' and a pass mask for the $1^{st}$ pass, image data for output consisting of the ejection signal C" for the $1^{st}$ pass of the printing material C is generated. The ejection signal C" is set to 1 indicating ejection of the printing material if both the binary signal C' and a value of a corresponding pixel in the pass mask are 1. The ejection signal C" is set to "0" indicating no ejection of the printing material if either of the binary signal C' and the value of the corresponding pixel in the pass mask is 0. In general, an image size of the pass mask is smaller than a size of a target image to be printed on the print medium, but in the present embodiment, the pass mask is repeatedly arranged in height and width and applied. Details of a method for generating a pass mask, which is a main part of the present embodiment, will be described later. It should be noted that pass separation is not needed for the structure shape data because each layer of the laminate structure is printed in one pass.

In S706, the CPU 601 controls the image printing unit 400 to print an image on a print medium. The image printing unit 400 laminates and prints the roughness forming material based on the structure shape data generated in S703 to form a structure having a roughness shape. Then, based on the ejection signals C",M",Y",K",S" of the printing materials, the printing materials C, M, Y, K, and S are ejected on an upper surface of the formed structure having a roughness shape to print color and gloss. In the present embodiment, a description has been given of an aspect of printing the printing materials on the upper surface of the formed structure having a roughness shape, but without forming a structure having a roughness shape, anisotropy may be reproduced only by printing color and gloss by controlling a time difference between ejections of a printing material.

(Procedure for generating a pass mask)

Figure 11:
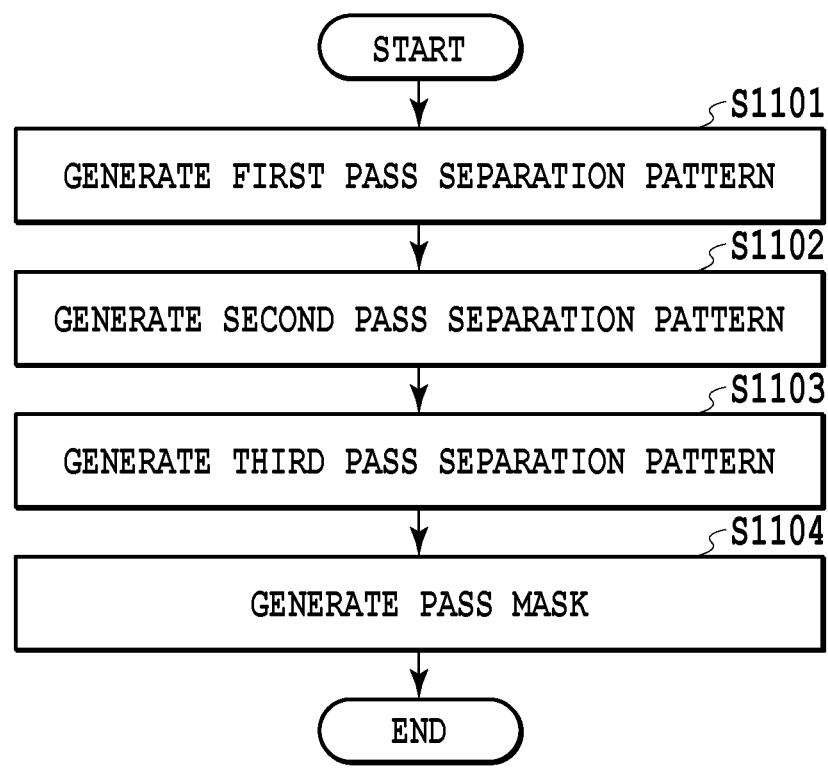
FIG. 11 is a flow chart showing a procedure for generating a pass mask according to the first embodiment.

FIG. 11 is a flow chart showing a procedure for generating a pass mask according to the present embodiment. With reference to the flow chart of FIG. 11, the procedure for generating a pass mask will be described. In S1101, the CPU 601 generates a first pass separation pattern based on h2, which is the anisotropy information. In this example, the pass separation pattern is image data consisting of 16 pixels in height and 16 pixels in width, for example, and each pixel in the pass separation pattern includes pass separation signals p1 to p8. The pass separation signal p1 indicates a probability of printing a target pixel in the $1^{st}$ pass. In the same manner, the pass separation signal pn indicates a probability of printing the target pixel in the $n^{th}$ pass. Each pass separation signal is a value not less than 0 and not greater than 1, and the sum of the pass separation signals p1 to p8 is 1.

Figure 12:
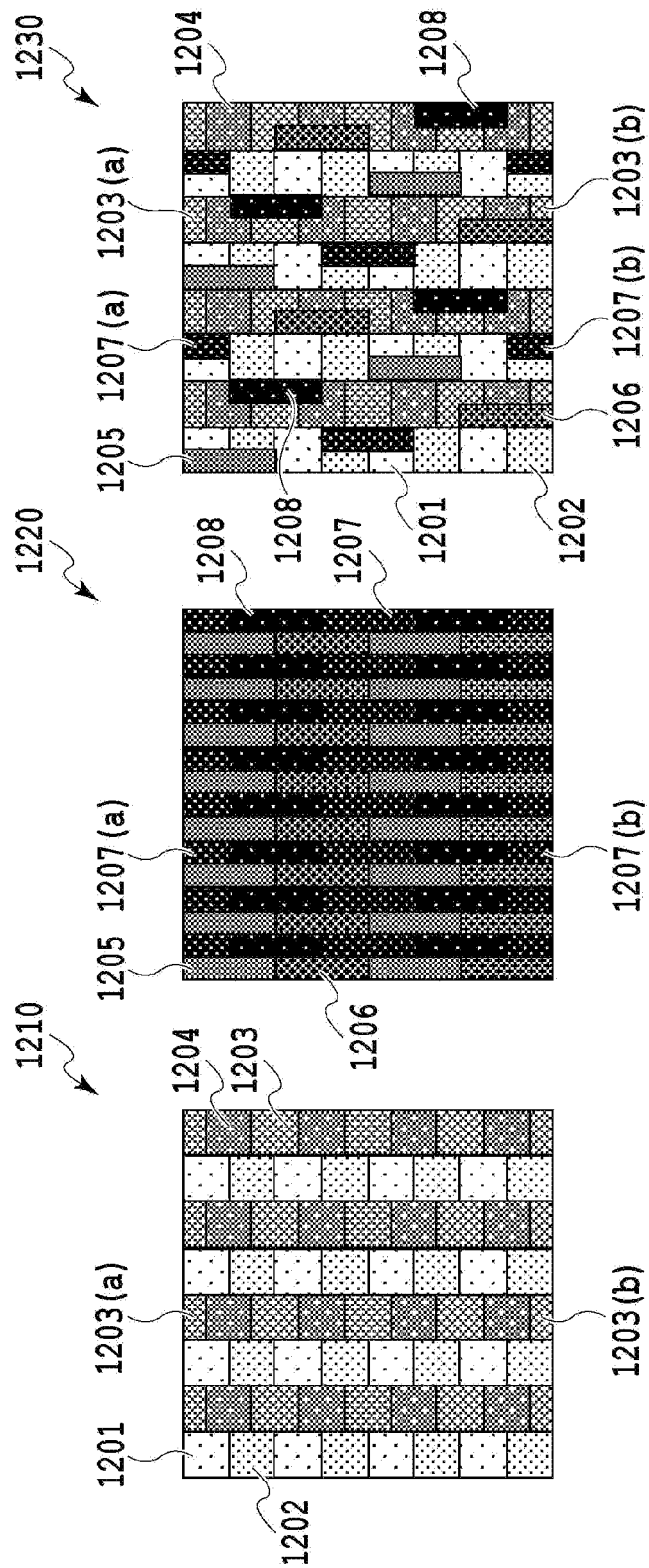
FIG. 12A to FIG. 12C are schematic views showing an example of a first pass separation pattern according to the first embodiment.

Next, with reference to the schematic view of FIG. 12A to FIG. 12C, the first pass separation pattern will be described. FIG. 12A is a schematic view showing an example of the first pass separation pattern corresponding to the case where h2, which is the anisotropy information, is a minimum, and shows an arrangement pattern of a printing material printed on the upper surface of the roughness shape of the structure 1001 in FIG. 10. A minimum value of h2 is set as h2_0. A first pass separation pattern 1210 includes four types of patches 1201 to 1204, each including 2 pixels in height and 2 pixels in width, and the patches having the same type are not arranged adjacent to one another. The arrangement pattern of the four types of patches is repeated vertically and horizontally, and a sign 1203(a) and a sign 1203(b) continuously form one patch 1203. In the first pass separation pattern 1210 corresponding to the case where the value of h2 is the minimum, pixels forming the patch 1201 include pass separation signals in which only the pass separation signal p1 is "1." That is, pixels included in the patch 1201 are printed in the $1^{st}$ pass. In the same manner, pixels forming the patches 1202, 1203, and 1204 include pass separation signals in which only the pass separation signals p2, p3, and p4 are "1," respectively. Pixels included in the patches 1202, 1203, and 1204 are printed in the $2^{nd}$, $3^{rd}$, and $4^{th}$ passes, respectively. In patch areas divided by the patches 1201 to 1204, a printing material is printed in the same pass. The printing material printed in the same pass forms a smooth surface as shown in FIG. 3B. The smooth surface formed by the printing material printed in the same pass is referred to as a smooth area. An image on which pass separation is performed by the first pass separation pattern 1210 has a smooth area having the same height and width, that is, 2 pixels in height and 2 pixels in width. More specifically, since the smooth area is formed to have the same height and width, an aspect ratio of the smooth area decreases. As a result, the image on which pass separation is performed by the first pass separation pattern 1210 becomes an image having a low-contrast anisotropy, in which a reflection characteristic does not change depending on a direction of incident light or an observation direction. It should be noted that the aspect ratio in the present embodiment is a value obtained by a mathematical expression 1-(b/a), where a is a maximum width of an area in a longer axial direction and b is a minimum width of the area in a shorter axis direction.

FIG. 12B is a schematic view showing an example of a first pass separation pattern corresponding to the case where h2, which is the anisotropy information, is a maximum, and shows an arrangement pattern of a printing material printed on the upper surface of the roughness shape of the structure 1003 in FIG. 10. A maximum value of h2 is set as h2_1. A first pass separation pattern 1220 includes four types of patches 1205 to 1208, each including 4 pixels in height and 1 pixel in width, and the patches having the same type are not arranged adjacent to one another. The arrangement pattern of the four types of patches is repeated vertically and horizontally, and a sign 1207(a) and a sign 1207(b) continuously form one patch 1207. In the first pass separation pattern 1220 corresponding to the case where the value of h2 is the maximum, pixels forming the patch 1205 include pass separation signals in which only the pass separation signal p5 is "1." That is, pixels included in the patch 1205 are printed in the 5$^{th}$ pass. In the same manner, pixels forming the patches 1206, 1207, and 1208 include pass separation signals in which only the pass separation signals p6, p7, and p8 are "1," respectively. Pixels included in the patches 1206, 1207, and 1208 are printed in the 6$^{th}$, 7$^{th}$, and 8$^{th}$ passes, respectively. Patch areas divided by the patches 1205 to 1208 each form a smooth area, in which a printing material is printed in the same pass. An image on which pass separation is performed by the first pass separation pattern 1220 has a smooth area having different height and width, that is, 4 pixels in length and 1 pixel in width. More specifically, since the smooth area is formed to have the different height and width, an aspect ratio of the smooth area increases. As a result, the image on which pass separation is performed by the first pass separation pattern 1220 becomes an image having a high-contrast anisotropy, in which a reflection characteristic changes depending on a direction of incident light or an observation direction.

FIG. 12C is a schematic view showing an example of the first pass separation pattern corresponding to the case where a value of h2, which is the anisotropy information, is h2_0<h2_2<h2_1. A first pass separation pattern 1230 corresponding to the case where h2 is h2_0<h2_2<h2_1 is a pass separation pattern formed by writing the patches 1205 to 1208 of the first pass separation pattern 1220 over the first pass separation pattern 1210. The number of patches 1205 to 1208 written over the first pass separation pattern 1210 is variable, and increases from 0 to 64 according to an increase in the value of h2, from h2_0 to h2_1. It should be noted that the pass separation pattern matches with the first pass separation pattern 1210 if the value of h2 is h2_0 and matches with the first pass separation pattern 1220 if the value of h2 is h2_1. An image on which the pass separation is performed by the first pass separation pattern 1230 also has an anisotropy contrast which is variable depending on the number of patches to be overwritten.

Figure 13:
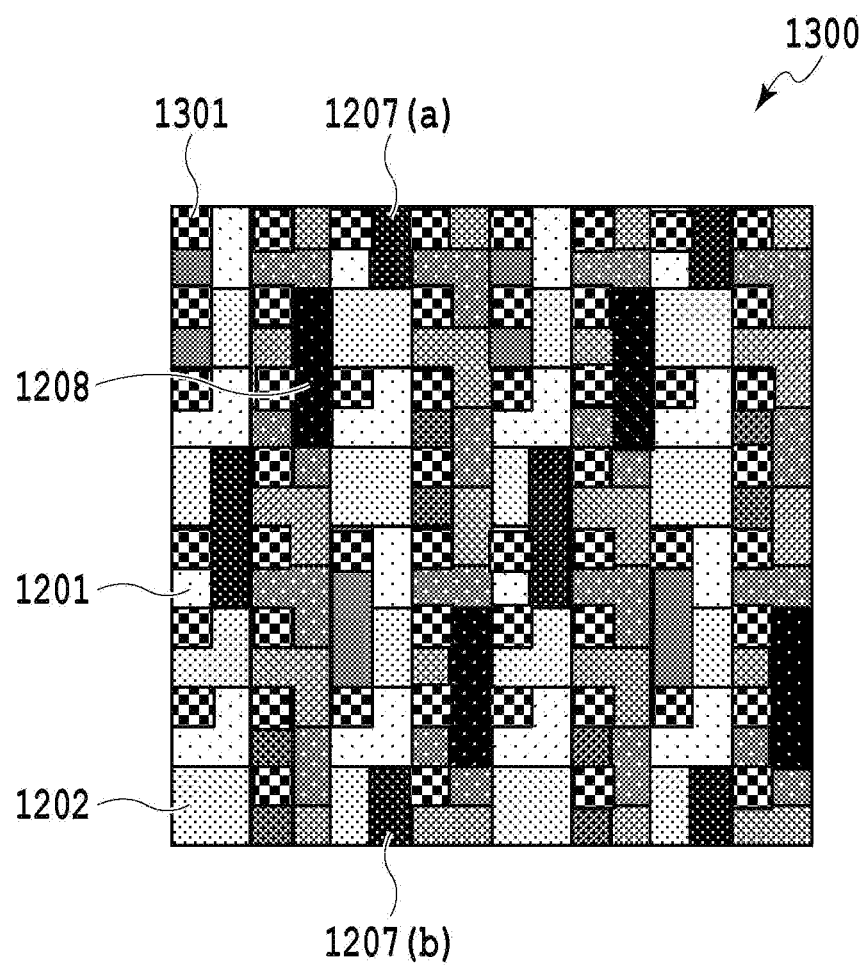
FIG. 13 is a schematic view showing an example of a second pass separation pattern according to the first embodiment.

In S1102, the CPU 601 generates a second pass separation pattern based on h1, which is the anisotropy information. More specifically, the CPU 601 generates a second pass separation pattern by writing a patch for diffusing printing passes over the first pass separation pattern generated in S1101. FIG. 13 is a schematic view showing an example of the second pass separation pattern. A second pass separation pattern 1300 shown in FIG. 13 is a pass separation pattern formed by writing a patch 1301 including 1 pixel in height and 1 pixel in width over the first pass separation pattern generated in S1101. Pixels forming the patch 1301 include pass separation signals in which the pass separation signals p1 to p8 are equally "0.125." That is, all of the pixels forming the patch 1301 are printed in any one of the 1$^{st}$ pass to the 8$^{th}$ pass with the same probability. Further, in a case where the probability of being printed in each pass is equal, the printing pass is determined so that pixels printed in the same scanning of the print head are diffused. In many cases, therefore, adjacent pixels are printed in different passes. The number of patches 1301 to be overwritten increases from 0 to 255 according to an increase in the value of h1, from a minimum h1_0 to a predetermined value h1_1. In a case where the number of patches 1301 to be overwritten is small, like the patch 1208 in the second pass separation pattern 1300, the number of areas in which adjacent pixels are printed in the same pass relatively increases. Meanwhile, in a case where the number of patches 1301 to be overwritten is large, due to the patches 1301 arranged in the second pass separation pattern 1300, the number of areas in which adjacent pixels are printed in the same pass relatively decreases. That is, controlling the arrangement of the patches 1301 to be overwritten can control a ratio between the number of areas printed in the same pass and the number of areas printed in different passes. It should be noted that the second pass separation pattern matches with the first pass separation pattern if the value of h1 is h1_0, and matches with a pattern in which all pixels are formed of the patches 1301 if the value of h1 is equal to or greater than h1_1. A pattern of the printing material printed on the upper surface of the roughness shape of the structure 1002 of FIG. 10 corresponds to a pattern in which all pixels are formed of the patches 1301.

In S1103, the CPU 601 performs a computation to rotate by $\phi$ degrees the second pass separation pattern 1300 generated in S1102 based on a signal $\phi$ and generates a third pass separation pattern. In the present embodiment, pass separation signals of the third pass separation pattern can be obtained in the following manner, for example. First, a position (i2,j2) in the second pass separation pattern 1300 corresponding to the pixel at row i3 and column j3 of the third pass separation pattern (i3,j3:0, 1, . . . , 15) is obtained by the following equation (1):

$$\begin{pmatrix} i_2 \\ j_2 \end{pmatrix} = \begin{pmatrix} \cos\phi & \sin\phi \\ -\sin\phi & \cos\phi \end{pmatrix} \begin{pmatrix} i_3 - 7 \\ j_3 - 7 \end{pmatrix} + \begin{pmatrix} 7 \\ 7 \end{pmatrix} \quad (1)$$

The equation (1) shows a content of a computation to rotate the third pass separation pattern by $-\phi$ degrees around the pixel at column 7 and row 7 of the third pass separation pattern. The pass separation signals at row i3 and column j3 of the third pass separation pattern correspond to the pass separation signals at row i2 and column j2 of the second pass separation pattern 1300. However, since values of i2 and j2 calculated by the equation (1) in general are not integers, it is needed to calculate pass separation signals corresponding to the pixel at row i2 and column j2 of the second pass separation pattern 1300. The pass separation signals can be calculated by linear interpolation as follows, for example. First, a largest integer not greater than i2 is set as i_min, a smallest integer greater than i2 is set as i_max, a largest integer not greater than j2 is set as j_min, and a smallest integer greater than j2 is set as j_max. Furthermore, each of i_min, i_max, j_min, and j_max is divided by 16, and their respective remainders are set as i_min', i_max', j_min', and j_max'. For example, if i_min is −1, i_min' is 15. Values of i_min', i_max', j_min', and j_max' are obtained from the range between 0 and 15. Next, a pass separation signal p_i2_jmin(n) at row i2 and column j_min of the second pass separation pattern 1300 is obtained by the following equation (2):

$$p\_i2\_jmin(n) = \alpha_i \times p\_imin\_jmin(n) + \beta_i \times p\_imax\_jmin(n) \quad (2)$$

Incidentally, p_imin_jmin(n) indicates an n$^{th}$ pass separation signal of the pixel at row i_min' and column j_min' of the second pass separation pattern 1300. In the same manner, p_imax_jmin(n) indicates an n$^{th}$ pass separation signal of the pixel at row i_max' and column j_min' of the second pass separation pattern 1300. Further, parameters αi and βi are obtained by the following equations (3) and (4):

$$\alpha_i = (i\_max - i_2)/(i\_max - i\_min) \quad (3)$$

$$\beta_i = (i_2 - i\_min)/(i\_max - i\_min) \quad (4)$$

Next, a pass separation signal p_i2_jmax(n) at row i2 and column j_max of the second pass separation pattern 1300 is obtained by the following equation (5):

$$p\_i2\_jmax(n) = \alpha_j \times p\_imin\_jmax(n) + \beta_j \times p\_imax\_jmax(n) \quad (5)$$

Note that p_imin_jmax(n) indicates an $n^{th}$ pass separation signal of the pixel at row i_min' and column j_max' of the second pass separation pattern 1300. In the same manner, p_imax_jmax(n) indicates an $n^{th}$ pass separation signal of the pixel at row i_max' and column j_max' of the second pass separation pattern 1300. Finally, a pass separation signal p_i2_j2(n) at row i2 and column j2 of the second pass separation pattern 1300 is obtained by the following equation (6):

$$p\_i2\_j2(n) = \alpha_j \times p\_i2\_jmin(n) + \beta_j \times p\_i2\_jmax(n) \quad (6)$$

Note that parameters $\alpha j$ and $\beta j$ are obtained by the following equations (7) and (8):

$$\alpha_j = (j\_max - j_2)/(j\_max - j\_min) \quad (7)$$

$$\beta_j = (j_2 - j\_min)/(j\_max - j\_min) \quad (8)$$

This p_i2_j2(n) is a pass separation signal of the pixel at row i3 and column j3 (i3,j3:0, 1, ..., 15) of the third pass separation pattern. According to the equation (6), pass separation signals of each pixel of the third pass separation pattern can be obtained from the pass separation signals of the pixel of the second pass separation pattern 1300. For all of the pixels of the third pass separation pattern, pass separation signals are obtained by the above equations (1) to (8). It should be noted that the processing in step S1103 is not limited to the above method. For example, a known two-dimensional interpolation method and the like may be used. The third pass separation pattern becomes data forming a pass mask according to a value of a signal $\phi$. The image printing apparatus 1 of the present embodiment performs control such that a longitudinal direction of a smooth area in which a printing material is printed with a small time difference becomes the same as a direction indicated by the signal $\phi$.

Next, in S1104, the CPU 601 generates a pass mask based on the pass separation signals of the third pass separation pattern and determines a pass in which each pixel of image data for output is printed. The pass mask of the present embodiment is image data consisting of 16 pixels in height and 16 pixels in width like the pass separation pattern, and one piece of image data is generated for each pass, that is, eight pieces of image data in total. A pixel forming each pass mask includes a binary signal pn'(n:1, 2, ..., 8) indicating whether or not to eject a printing material in a corresponding pass. For example, p1' indicates a signal of a pass mask for printing the $1^{st}$ pass. In pass mask generation processing, pixels are sequentially processed from an upper left pixel in the pass mask to the right one by one, and if the processing on the right end pixel is finished, the processing moves to the left end pixel in a row immediate below. All pixels are sequentially processed in the same manner to the lower right pixel. The pass mask is generated by using a known error diffusion method, for example.

Figure 14:
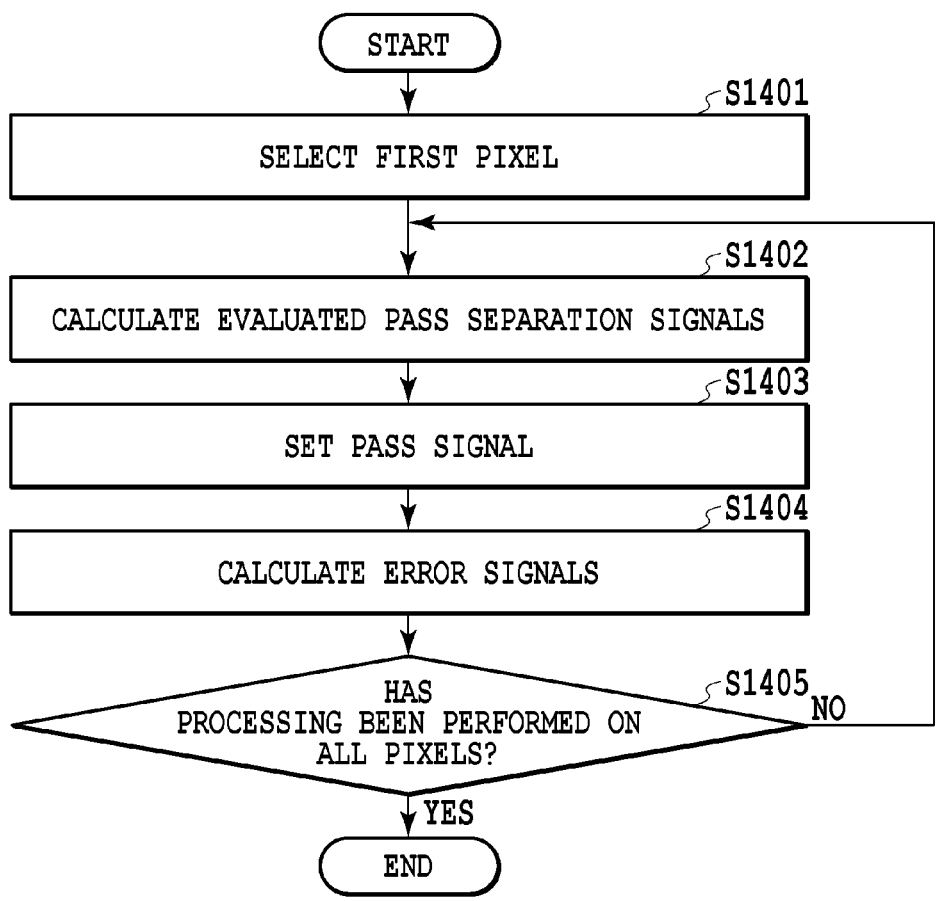
FIG. 14 is a flow chart showing a procedure for generating a pass mask according to the first embodiment.

FIG. 14 is a flow chart showing a procedure for generating a pass mask from the third pass separation pattern. In S1401, the CPU 601 selects an upper left pixel of the third pass separation pattern as a first pixel to be processed.

In S1402, the CPU 601 calculates evaluated pass separation signals obtained by the addition of error signals from adjacent pixels to pass separation signals of a target pixel. For example, it is assumed that pass separation signals of the target pixel are (p1,p2,p3,p4,p5,p6,p7,p8)=(0,0,0.5,0.5,0,0,0,0) and error signals are (0,0,0,0.3,0,0,0,0). In this case, the evaluated pass separation signals are (0,0,0.5,0.8,0,0,0,0).

In S1403, the CPU 601 selects a maximum from the evaluated pass separation signals p1 to p8, and a pass mask for a corresponding pass is set to 1, and pass masks for other passes are set to 0. In the above example, the maximum among the evaluated pass separation signals p1 to p8 is 0.8 which corresponds to p4. Accordingly, a signal p4' of the 4-pass pass mask is set to 1 and signals p1',p2',p3',p5',p6', p7',p8' of the 1- to 3-pass and 5- to 8-pass pass masks are set to 0. In a case where there are a plurality of maximums among the evaluated pass separation signals p1 to p8, one of them is selected to make the above settings.

Figure 15:
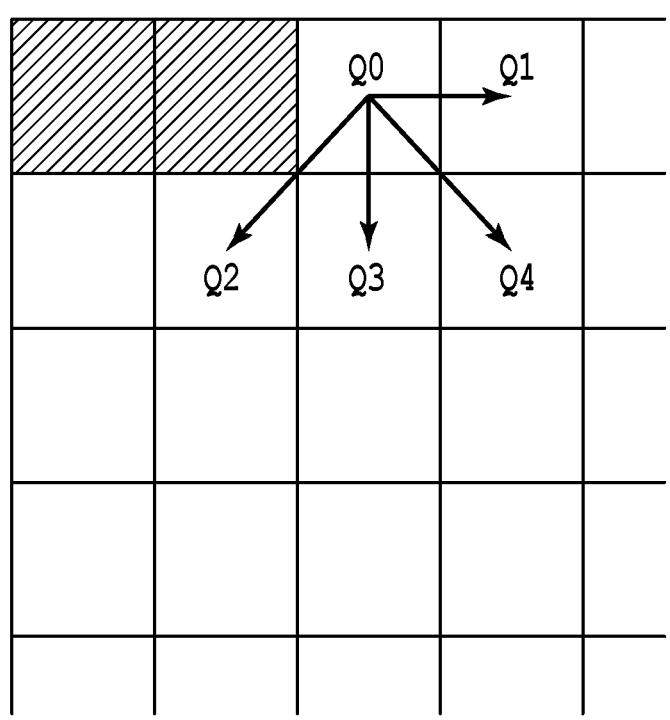
FIG. 15 is a schematic view for explaining a mechanism of error diffusion according to the first embodiment.

In S1404, the CPU 601 calculates error signals and diffuses them to adjacent pixels. The error signals are obtained by the subtraction of pass separation signals corresponding to the pass selected in S1403 from the above evaluated pass separation signals. In the above example, the selected pass is the $4^{th}$ pass, and the corresponding pass separation signals are (0,0,0,1,0,0,0,0) and error signals are (0,0,0.5,−0.2,0,0,0,0). FIG. 15 is a schematic view for explaining a mechanism of diffusing error from a target pixel of pass mask generation processing to the adjacent pixels. In the schematic view of FIG. 15, Q0 indicates a target pixel for the pass mask generation processing, and an area with oblique lines shows a processed pixel on which a printing pass has already been determined. Error of the target pixel Q0 is diffused at a predetermined ratio to pixels Q1, Q2, Q3, and Q4 which are adjacent to Q0 and on which a pass signal has not been determined. For example, error signals 7/16, 3/16, 5/16, and 1/16 of Q0 are diffused to the pixels Q1, Q2, Q3, and Q4. If the probability of being printed in each pass is equal, the adjacent pixels have a lower probability of being printed in a pass determined to be a printing pass because negative error signals are diffused to the adjacent pixels. As a result, pixels printed in the same pass are determined to be diffused.

In S1405, it is determined whether processing has been performed on all pixels. If there is an unprocessed pixel, a target pixel for the pass mask generation processing is updated and the process returns to step S1402. If processing has been performed on all pixels, the processing is finished.
(Functional configuration)

Figure 16:
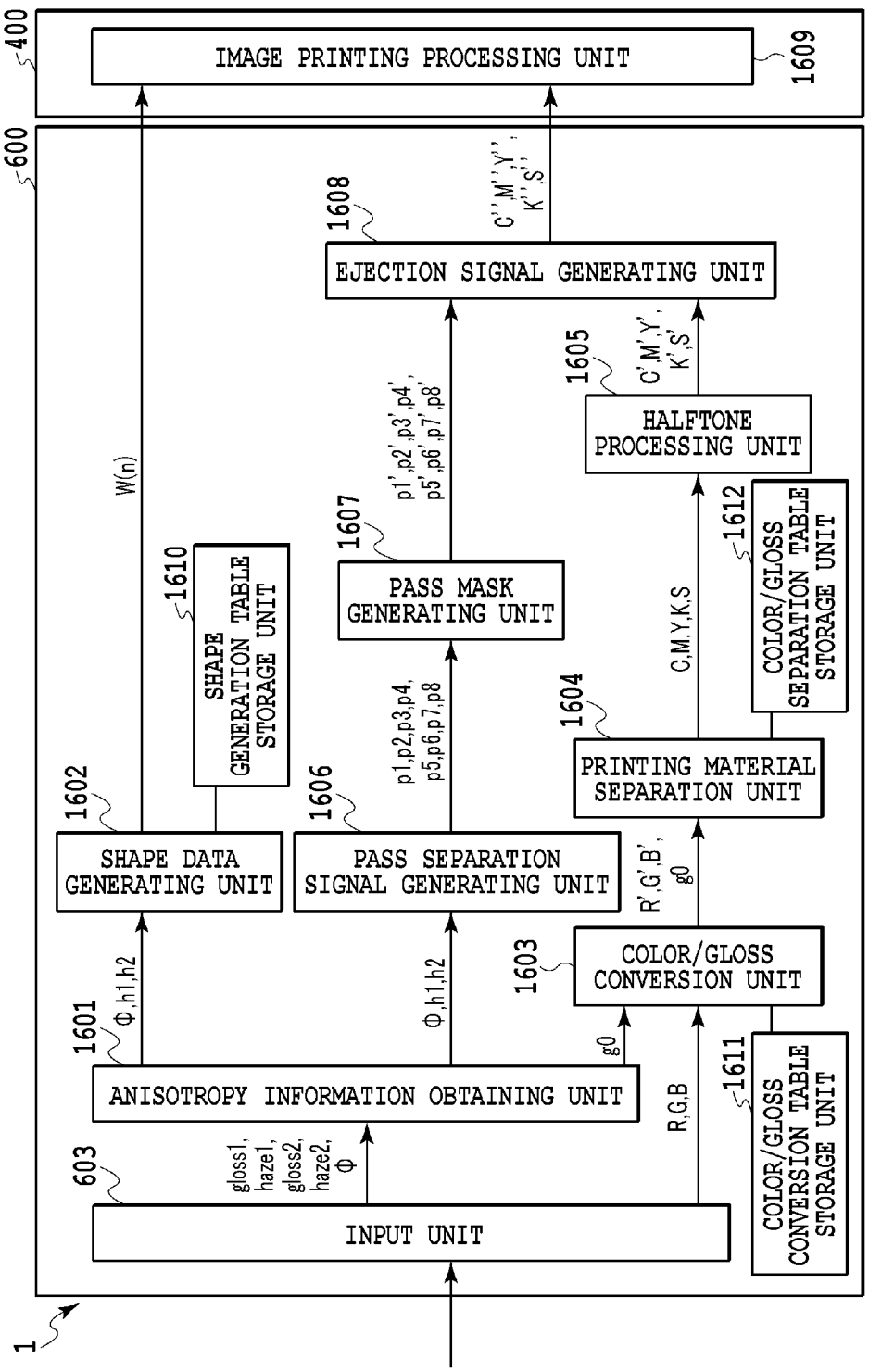
FIG. 16 is a block diagram showing a functional configuration of the image printing apparatus according to the first embodiment.

FIG. 16 is a block diagram showing a functional configuration of an image printing apparatus according to the present embodiment. The input unit 603 inputs RGB color signals. In addition to the RGB color signals, the input unit 603 inputs a signal $\phi$ specifying an azimuth angle at which a reflection intensity of specular reflected light corresponding to incident light becomes a maximum, a signal gloss1 specifying the reflection intensity of the specular reflected light in an azimuth angle $\phi$, and a signal haze1 specifying a reflection intensity of diffused light near the specular reflection direction. Further, the input unit 603 inputs a signal gloss2 specifying the reflection intensity of the specular reflected light corresponding to the incident light in a direction orthogonal to the azimuth angle $\phi$ and a signal haze2 specifying a reflection intensity of diffused light near the specular reflection direction. An anisotropy information obtaining unit 1601 performs the processing of S703 in the image printing procedure of FIG. 7. That is, the anisotropy information obtaining unit 1601 calculates signals g0, h1, and h2 from gloss1, gloss2, haze1, and haze2. A shape data generating unit 1602 performs the processing of S703 in the image printing procedure of FIG. 7. That is, the shape data generating unit 1602 refers to the shape generation table 900 stored in a shape generation table storage unit 1610 and generates an ejection signal W(n) of a roughness forming material from the signals φ, h1, and h2.

A color/gloss conversion unit 1603, a printing material separation unit 1604, and a halftone processing unit 1605 perform the processing of S704 in the image printing procedure of FIG. 7. That is, the color/gloss conversion unit 1603 refers to a color conversion table and a gloss conversion table stored in a color/gloss conversion table storage unit 1611 and calculates color signals R',G',B' which are dependent on the printing apparatus and a gloss signal g0' from the signals RGB and g0. The printing material separation unit 1604 refers to a color separation table and a gloss separation table stored in a color/gloss separation table storage unit 1612 and calculates signals C,M,Y,K,S specifying amounts of printing materials from the color signals R',G',B' and a gloss signal g'. The halftone processing unit 1605 calculates binary signals C',M',Y',K',S' specifying arrangement of printing materials from the signals C,M,Y,K,S specifying amounts of printing materials.

A pass separation signal generating unit 1606 performs the processing of S1101 to S1103 in the pass mask generation processing of FIG. 11. That is, pass separation signals p1 to p8 of the third pass separation pattern are calculated from the signals φ, h1, and h2. A pass mask generating unit 1607 performs the processing of S1104 in the pass mask generation processing of FIG. 11. That is, the pass separation signals p1 to p8 of the third pass separation pattern are binarized, and signals p1' to p8' forming a pass mask for each pass are calculated. An ejection signal generating unit 1608 performs the processing of S705 in the image printing procedure of FIG. 7. That is, the ejection signal generating unit 1608 performs pass separation on binary signals C',M',Y',K',S' by using a pass mask for each pass and generates ejection signals C",M",Y",K",S" for each pass. An image printing processing unit 1609 performs the processing of S706 in the image printing procedure of FIG. 7. That is, a roughness forming material is laminated and printed on a print medium based on shape data W(n) to form a structure having a roughness shape. The image printing processing unit 1609 further ejects each printing material on the upper surface of the formed structure having a roughness shape based on the ejection signals C",M",Y",K",S" to print color and gloss.

Figure 17:
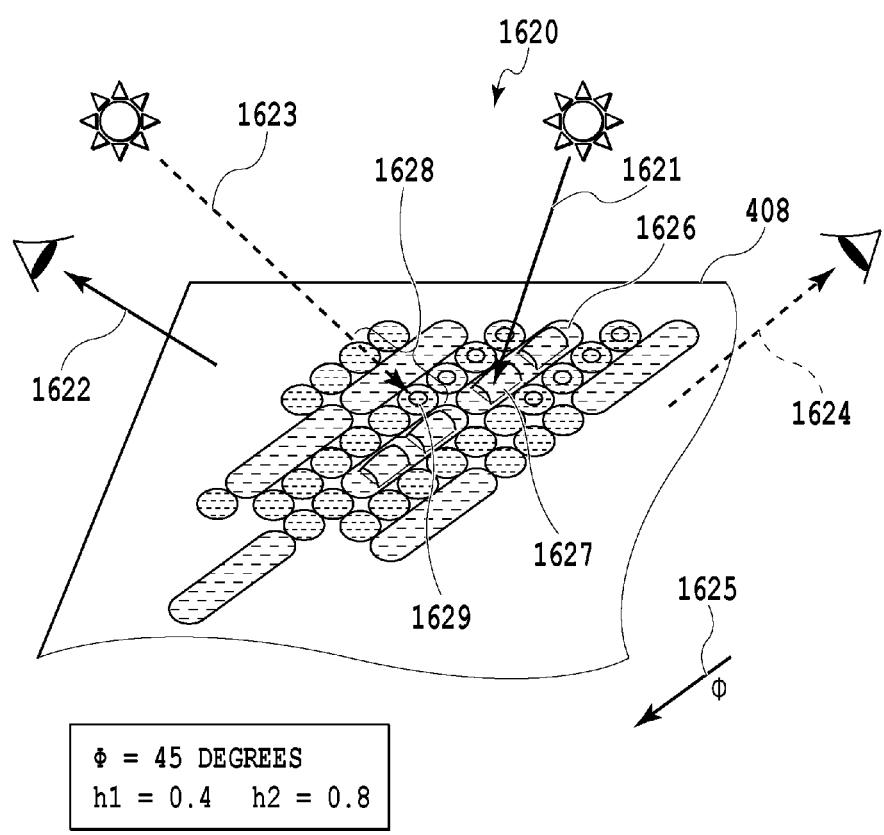
FIG. 17 is a view showing an exemplary output image according to the first embodiment.

FIG. 17 is a view showing an exemplary output image from the image printing apparatus 1 according to the present embodiment. An output image 1620 of the present embodiment is schematically shown as an example outputted on the print medium 408 in a case where a value of h1 is 0.4, a value of h2 is 0.8, and a value of φ is 45 degrees. The output image 1620 is an image formed on the print medium 408 by the image printing processing unit 1609 based on the ejection signals C",M",Y",K",S" for each pass generated by the ejection signal generating unit 1608.

A first area 1626 is an area formed by a printing material adjacently ejected in an azimuth angle φ direction in the same scanning of the print head. Since the printing material lands adjacently in a short period of time, the landed printing material forms a high-smoothness area in the first area 1626. As a result, the first area 1626 has a low degree of scattering with respect to incident light 1621 from the φ direction and has a high degree of scattering with respect to a direction orthogonal to the φ direction. As described above, such control of ejection signals for each pass is performed by the signals p1' to p8' forming a pass mask for each pass generated by the pass mask generating unit 1607. A first structure 1627 is a structure having a roughness shape formed based on the shape data W(n) generated by the shape data generating unit 1602. The image printing processing unit 1609 prints the first structure 1627 based on the shape data W(n) so as to have a shape having different radii of curvature between the φ direction and the direction orthogonal to the φ direction. Since the radius of curvature in the φ direction is small and the radius of curvature in the direction orthogonal to the φ direction is large, the first structure 1627 has a low degree of scattering with respect to the incident light from the φ direction and has a high degree of scattering with respect to the direction orthogonal to the φ direction. Accordingly, in a case where the incident light 1621 from the φ direction and an observation direction 1622 are in the relation of regular reflection, a reflection intensity of the first area 1626 becomes higher than that in a case where incident light 1623 from the direction orthogonal to the φ direction and an observation direction 1624 are in the relation of regular reflection. As a result, the first area 1626 is viewed as lighter, with a higher gloss, than a second area 1628. In the present embodiment, the first area 1626 printed in the same pass is formed on the upper surface of the first structure 1627. By matching a scattering property of the structure 1627 with a scattering property of the area 1626 printed on the upper surface thereof, a high-contrast anisotropy can be exhibited.

The second area 1628 is an area formed by a printing material adjacently ejected in the azimuth angle φ direction by a plurality of different scannings of the print head. Since a printing material lands at some time intervals, the landed printing material is laminated in the second area 1628 to form a low-smoothness area having fine roughness. As a result, the second area 1628 has a high degree of scattering regardless of the direction of the incident light. As described above, such control of ejection signals for each pass is performed by the signals p1' to p8' forming a pass mask for each pass generated by the pass mask generating unit 1607. A second structure 1629 is a structure having a roughness shape formed based on the shape data W(n) generated by the shape data generating unit 1602. The image printing processing unit 1609 prints the second structure 1629 based on the shape data W(n) so as to be large in size with the same radius of curvature between the φ direction and the direction orthogonal to the φ direction. Since a radius of curvature is large regardless of the direction, the second structure 1629 has a high degree of scattering regardless of the direction of the incident light. Accordingly, in a case where the incident light and the observation direction are in the relation of regular reflection, a reflection intensity in the second area 1628 is substantially the same regardless of whether the incident light is the incident light 1621 from the φ direction or the incident light 1623 from the direction orthogonal to the φ direction.

In the present embodiment, in a case where the incident light 1621 from the φ direction and the observation direction 1622 are in the relation of regular reflection, a specular reflection intensity in the first area 1626 becomes relatively higher than that in the second area 1628. As a result, the first area 1626 is viewed as lighter, with a higher gloss, than the second area 1628. Meanwhile, as illustrated in FIG. 1A to FIG. 1D, in a case where the observation direction 1622 is a direction slightly shifted from the specular reflection direction (for example, by α degrees in FIG. 1A to FIG. 1D), the first area 1626 viewed as lighter and the second area 1628 viewed as darker are reversed. More specifically, the first area 1626 is viewed as darker than the second area 1628. The output image 1620 of the present embodiment is formed as described above, and therefore, it is possible to print an image reproducing anisotropy such as gloss and color which vary depending on the incident light or observation direction.

As described above, based on the inputted image data, the image printing apparatus 1 of the present embodiment obtains anisotropy information including an azimuth angle $\phi$ at which a reflection intensity of specular reflected light becomes a maximum and h1 and h2 specifying degrees of scattering of surface reflected light. The image printing apparatus 1 determines a time difference between ejections of a printing material based on the obtained anisotropy information and generates an ejection signal of the printing material for generating an image. The image printing unit 400 ejects the printing material on the print medium with a time difference of a predetermined threshold or less to form a smooth area on the print medium. The above configuration allows the image printing apparatus 1 of the present embodiment to print an image reproducing high anisotropy.

MODIFICATION EXAMPLE 1

The image printing apparatus 1 of the first embodiment applies control of an ejection time difference based on the obtained anisotropy information to all of the printing materials C, M, Y, K, and S which reproduce color and gloss. In a modification example 1, a description will be given of an image printing apparatus 1 which applies control of an ejection time difference based on anisotropy information only to specific printing materials.

The image printing apparatus 1 of the modification example 1 divides the printing materials into a group of two light color printing materials Y and S and a group of three dark color printing materials C, M, and K and applies the control of an ejection time difference based on anisotropy information only to the group of two light color printing materials Y and S. In the control of an ejection time difference as described in the first embodiment, ejecting a printing material in the same pass allows the printing material arranged adjacently to merge, thereby forming a smooth surface on a print medium. However, when the printing material merges, a printing position at which the printing material lands on the print medium slightly changes, which may be exhibited as granular noise or stripes. In this case, applying the control of an ejection time difference only to the light color printing materials, which make the granular noise or stripes less visible, can preferably print an image reproducing anisotropy. An ejection signal generating unit 1608 of the modification example 1 uses a pass mask generated in a pass mask generating unit 1607 and performs pass separation on color data and gloss data respectively consisting of binary signals Y',S'.

Meanwhile, the ejection signal generating unit 1608 performs pass separation on color data consisting of binary signals C',M',K' not depending on anisotropy information, but by using a pass mask for performing control such that pixels printed in the same scanning by a print head are diffused and arranged. As an example of such a pass mask, it is possible to use a pass mask used by the ejection signal generating unit 1608 in a case where a value of h1 is equal to or greater than h1_1 in the first embodiment, for example. This pass mask will be hereinafter referred to as a diffusion pass mask. In an image printing procedure of the modification example 1, in ejection signal generation processing (S705), pass separation is performed on the printing materials Y and S by using a pass mask generated based on anisotropy information. Meanwhile, pass separation is performed on the printing materials C, M, and K by using the diffusion pass mask to generate an ejection signal for each pass. A description of other features will be omitted since they are the same as those in the first embodiment.

As described above, the image printing apparatus of the present modification example determines a time difference between ejections of a specific type of printing material based on anisotropy information and, based on the determined time difference, generates an ejection signal of the specific type of printing material. According to the above feature, the image printing apparatus 1 of the present embodiment can print an image reproducing high anisotropy without making the granular noise or stripes easily visible.

MODIFICATION EXAMPLE 2

In the present modification example, a description will be given of an image printing apparatus 1 which applies control of an ejection time difference based on anisotropy information only to a printing material used for printing a surface layer of an image. The image printing apparatus 1 of the modification example 2 uses two types of printing materials that are colorless and transparent for controlling gloss. More specifically, in addition to the gloss adjusting material S, a gloss adjusting material T is used. One of these two types of printing materials is printed on a surface layer of an image to exhibit any gloss. The control of an ejection time difference as described in the first embodiment is applied only to the two types of printing materials S and T but not to the other printing materials C, M, Y, and K. Performing the control of an ejection time difference based on anisotropy information only on the printing material used for printing a surface layer of an image can omit processing based on anisotropy information for the printing materials other than the gloss adjusting materials S and T, and reduce processing load on the image printing apparatus 1. Material having a refractive index lower than that of color ink is used for the gloss adjusting material S, and material having a refractive index higher than that of color ink is used for the gloss adjusting material T.

An ejection signal generating unit 1608 of the modification example 2 uses a pass mask generated in a pass mask generating unit 1607 to perform pass separation on gloss data consisting of binary signals S',T'. Meanwhile, the ejection signal generating unit 1608 performs pass separation on color data consisting of binary signals C',M',Y',K' by using a diffusion pass mask. Further, a printing material separation unit 1604 of the modification example 2 refers to a gloss separation table to convert a signal g0' into signals S,T specifying amounts of the gloss adjusting materials. The gloss separation table is a table which describes gloss printing materials S and T corresponding to a discrete gloss signal g0' and uses a known interpolation method. In this example, to match structure shape data with a resolution, a pixel of inputted image data is divided into 16 blocks in height and 16 blocks in width, and the same signals S,T are associated with all of 256 blocks in total. Gloss printing material signals S and T respectively represent a probability of printing a target area by the gloss adjusting material S and a probability of printing the target area by the gloss adjusting material T, and the sum of the probabilities is 1. In a block having a small signal g0', more pixels are printed by the gloss adjusting material S which has a low refractive index so as to decrease a reflected light amount. That is, the gloss separation table describes a small signal g0' in association with a large gloss printing material signal S and a small gloss printing material signal T. Meanwhile, in a block having a large signal g0', more pixels are printed by the gloss adjusting material T which has a high refractive index so as to increase a reflected light amount. That is, the gloss separation table describes a large signal g0' in association with a large gloss printing material signal T and a small gloss printing material signal S.

Furthermore, from the gloss printing material signals S,T, a halftone processing unit 1605 of the present modification example generates a binary signal S' specifying whether to arrange the gloss adjusting material S or the gloss adjusting material T in each block. The binary signal S' indicates, for example, arrangement of the gloss adjusting material S if a value is 0 and arrangement of the gloss adjusting material T if a value is 1. That is, either the gloss adjusting material S or the gloss adjusting material T is printed on the surface layer of the image. In the present modification example, in the halftone processing, the processing method of the pass mask generation processing (S1104) of the first embodiment is used. That is, a CPU 601 generates an evaluated signal by the addition of an error signal from adjacent areas to a gloss printing material signal of a target area, and then compares an S component and a T component of the evaluated signal to control the printing material corresponding to the component having a larger value to be arranged in the target area. Then, an error signal is obtained by the subtraction of 1 from a value of the component corresponding to the printing material to be arranged, of the components of the evaluated signal, and is diffused to the adjacent pixels.

Next, an image printing processing unit 1609 of the present modification example first laminates and prints a roughness forming material W based on shape data W(n) to form a structure having a roughness shape. Then, on an upper surface of the formed structure having a roughness shape, color is printed based on ejection signals C",M",Y", K". Then, a conveying roller 409 is rotated backward to return a print medium 408 to a print start position to print gloss by ejecting the gloss adjusting material S or the gloss adjusting material T based on the ejection signal S' on the color printed image. In an image printing procedure of the present modification example, in S704, the color/gloss conversion unit 1603 described in the first embodiment and the printing material separation unit 1604 and the halftone processing unit 1605 of the modification example 2 are used to obtain a binary signal specifying arrangement of each printing material. Further, in the ejection signal generation processing (S705), pass separation is performed on the printing materials S and T by using a pass mask generated based on anisotropy information like the first embodiment. Meanwhile, pass separation is performed on the printing materials C, M, Y, and K by using a diffusion pass mask not depending on anisotropy information. In image printing (S706), the image printing processing unit 1609 of the modification example 2 first laminates and prints the roughness forming material W to form a structure having a roughness shape, then color is printed by the printing materials C, M, Y, and K, and finally gloss is printed by the printing materials S and T. A description of other kinds of processing will be omitted since they are the same as those in the first embodiment.

As described above, the image printing apparatus of the present modification example determines a time difference between ejections of a printing material used for printing a surface layer of an image based on anisotropy information and, based on the determined time difference, generates an ejection signal of the printing material used for printing the surface layer of the image. According to the above feature, the image printing apparatus 1 of the present embodiment can print an image reproducing high anisotropy while reducing processing load.

MODIFICATION EXAMPLE 3

In the present modification example, an image printing apparatus 1 receives a printing condition setting and controls a time difference between ejections of a printing material based on the received printing condition and anisotropy information. The image printing apparatus 1 of the present modification example will be described.

Figure 18:
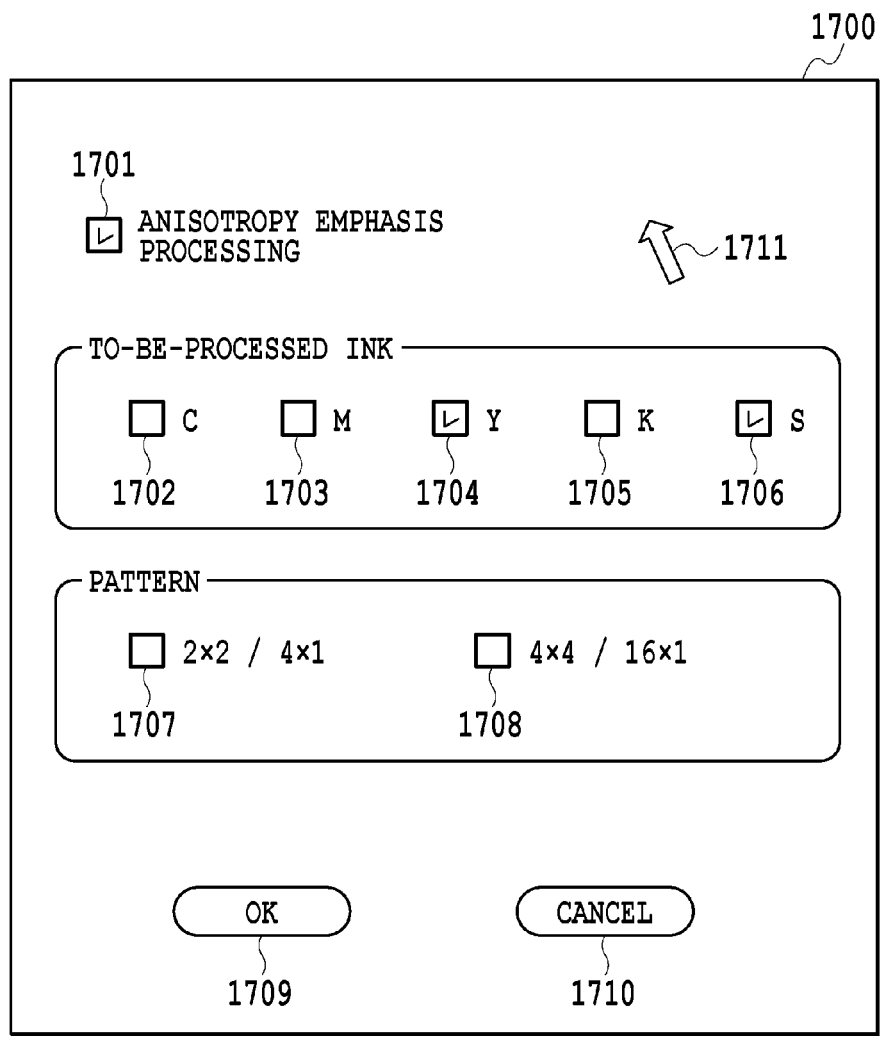
FIG. 18 is a schematic view showing an exemplary UI according to a modification example 3.

FIG. 18 is a schematic view showing an example of a UI (User Interface) 1700 which receives a printing condition setting. The UI 1700 of the present modification example is displayed, for example, on a monitor 610, and receives a user operation via an input unit 603. The UI 1700 of the present modification example includes an anisotropy emphasis processing checkbox 1701, to-be-processed ink setting checkboxes 1702 to 1706, and pattern selection radio buttons 1707 and 1708. The UI 1700 also includes an OK button 1709 and a cancel button 1710, and a sign 1711 indicates a mouse cursor. A user can select each checkbox and each button by operating the mouse cursor 1711. The anisotropy emphasis processing checkbox 1701 receives a printing condition setting indicating whether to perform control of a time difference between ejections of a printing material. If selection of the checkbox 1701 is inputted, selection of the checkboxes 1702 to 1706 and the radio buttons 1707 and 1708 becomes available. If the anisotropy emphasis processing checkbox 1701 is unchecked, the checkboxes 1702 to 1706 and the radio buttons 1707 and 1708 are grayed out, and selection by the mouse cursor 1711 becomes unavailable. The to-be-processed ink setting checkboxes 1702 to 1706 are checkboxes for setting a printing material to be processed. The checkboxes 1702 to 1706 are respectively associated with printing materials C, M, Y, K, and S, and if a checkbox is checked, the corresponding printing material is set as a printing material to be processed. If the checkbox is unchecked, the corresponding printing material is excluded from a printing material to be processed. For example, in a case where the checkboxes 1704 and 1706 and the checkboxes 1702, 1703, and 1705 are unchecked, the printing materials Y and S are set as printing materials to be processed.

The pattern selection radio buttons 1707 and 1708 are radio buttons for receiving a setting input of a patch shape used in a first pass separation pattern. If the radio button 1707 is selected, a patch having 2 pixels in height and 2 pixels in width is set to a shape with a small aspect ratio which is used for low anisotropy, and a patch having 4 pixels in height and 1 pixel in width is set to a shape with a large aspect ratio which is used for high anisotropy. If the radio button 1708 is selected, a patch having 4 pixels in height and 4 pixels in width is set to a shape with a small aspect ratio which is used for low anisotropy, and a patch having 16 pixels in height and 1 pixel in width is set to a shape with a large aspect ratio which is used for high anisotropy. As the initial setting of the UI 1700, the radio button 1707 is being selected, and if a selection input to the radio button 1708 is received, a selection input to the radio button 1707 is released. In contrast, if a selection input to the radio button 1707 is received while the radio button 1708 is selected, a selection input to the radio button 1708 is released. If a selection input to the OK button 1709 is received, printing conditions received by the input to each checkbox and each radio button are confirmed. If a selection input to the cancel button 1710 is received, printing conditions received by the input to each checkbox and each radio button are cancelled, and the printing conditions before receiving the setting are maintained.

In the present modification example, a pass separation signal generating unit 1606 and an ejection signal generating unit 1608 perform processing based on the set and received printing conditions. In a case where control of an ejection time difference is not performed, the processing by the pass separation signal generating unit 1606 and a pass mask generating unit 1607 of the present modification example is skipped. Then, the ejection signal generating unit 1608 of the present modification example performs pass separation by using a diffusion pass mask not depending on anisotropy information. Meanwhile, in a case where control of an ejection time difference is performed, the pass separation signal generating unit 1606 of the present modification example generates a first pass separation pattern with a set patch shape.

Then, the pass mask generating unit 1607 of the present modification example generates a pass mask based on the set patch shape. In a case where control of an ejection time difference is performed, the ejection signal generating unit 1608 of the present modification example performs pass separation on the printing material set as a printing material to be processed among binary signals C',M',Y',K',S' by using the pass mask generated in the pass mask generating unit 1607. On the printing material not set as a printing material to be processed among the binary signals C',M',Y',K',S', pass separation is performed by using a diffusion pass mask not depending on anisotropy information. In an image printing procedure of an image printing apparatus 1 of the present modification example, a printing condition setting is received before ejection signal generation processing (S705). For example, a printing condition setting using the UI 1700 is received before performing a data input (S701). As described above, in the image printing procedure of the present modification example, the ejection signal generating unit 1608 performs pass separation on the printing material set as a printing material to be processed among the binary signals C',M',Y',K',S' by using a pass mask generated in the pass mask generating unit 1607 (S705). A description of other features will be omitted since they are the same as those in the first embodiment.

As described above, the image printing apparatus 1 of the present modification example further includes a receiving unit receiving a printing condition setting, determines a time difference between ejections of a printing material based on anisotropy information and a printing condition, and generates an ejection signal of the printing material based on the determined time difference and printing condition. According to the above feature, the image printing apparatus 1 of the present embodiment can print an image reproducing high anisotropy under an optimum printing condition for a user.

[Second Embodiment]

In the present embodiment, a description will be given of an image printing apparatus of a type which prints an image by using a plurality of print heads, not a type which prints an image by reciprocating scanning of a print head.

Figure 19:
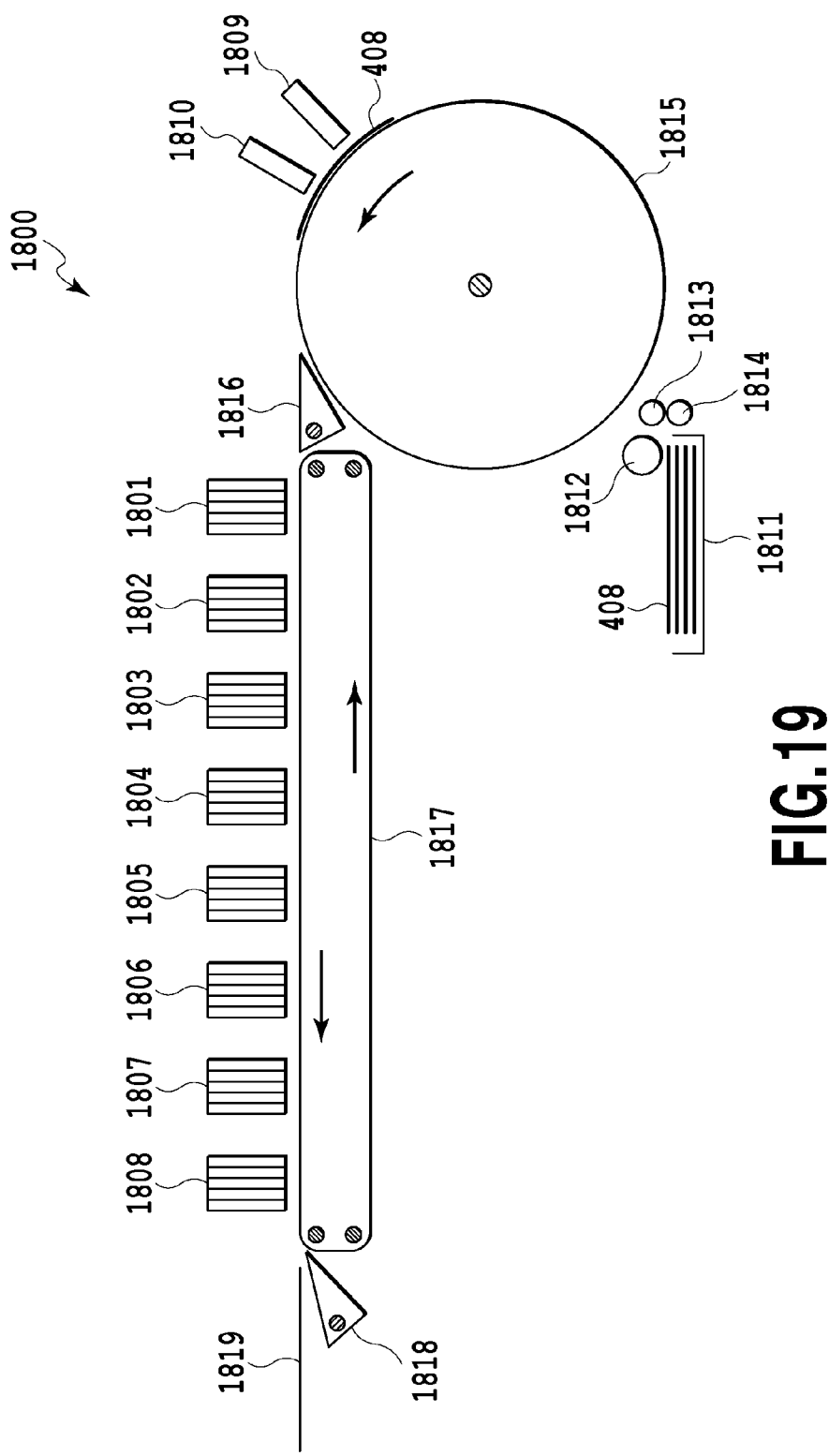
FIG. 19 is a block diagram showing a schematic configuration of an image printing unit according to a second embodiment.

FIG. 19 is a block diagram showing a schematic configuration of an image printing unit 1800 of the present embodiment. The image printing unit 1800 is an ink jet printer having a plurality of print heads. Print heads 1801 to 1808 individually have ejection units for ejecting five types of printing materials C, M, Y, K, and S, and print color and gloss on a print medium by ejection of the printing materials from the ejection units. The print heads 1801 to 1808 are long heads having a size in a direction vertical to a paper surface greater than a width of the print medium. One line in the direction vertical to the paper surface is printed without the scanning of each print head. Further, there is a sufficient distance between the print heads so that an ink droplet printed by adjacent print heads does not merge. The printing material ejected from the ejection unit included in the same print head is ejected with a small ejection time difference from the ejection unit, and the printing material merges as soon as it lands on the print medium, thereby forming a smooth surface. Meanwhile, the printing material ejected from the ejection units included in different print heads is ejected with a great ejection time difference from the ejection units. Thus, the printing material does not merge even if it lands adjacently on the print medium. Accordingly, it does not form a smooth surface.

The image printing apparatus 1 of the present embodiment determines which print head is used to eject each printing material based on anisotropy information, so as to control a time difference between printings of a printing material arranged adjacently. A description will be given with reference to FIG. 19. A print medium 408 loaded on a paper feed tray 1811 is fed by individual rotations of a paper feed roller 1812, a conveying roller 1813, and a separation roller 1814, and the fed print medium 408 is electrostatically adsorbed on a conveying drum 1815. The conveying drum 1815 rotates in an arrow direction shown in FIG. 19. The conveying drum 1815 rotates so that the print medium 408 adsorbed by the conveying drum 1815 passes an area opposite to a print head 1809 predetermined times. The print head 1809 ejects a roughness forming material W at a timing at which the print medium 408 passes the front of the print head 1809. Then, an ultraviolet radiation device 1810 irradiates the roughness forming material W ejected on print medium 408 with ultraviolet rays to cure the roughness forming material W. The print head 1809 laminates and prints the roughness forming material W on the print medium 408 to form a structure having a roughness shape. For example, the print head 1809 prints a first layer at a first timing at which the print medium 408 passes the area opposite to the print head 1809, and after the conveying drum 1815 further rotates once, prints a second layer at a timing at which the print medium 408 passes the area opposite to the print head 1809 next time. In the case of forming a roughness shape having a laminate structure of 100 layers, the conveying drum 1815 rotates 100 times with the print medium 408 adsorbed on the conveying drum 1815. If formation of the structure having a roughness shape is completed, the print medium 408 is separated from the conveying drum 1815 by a drum separation lug 1816 and then electrostatically adsorbed on a conveying belt 1817. The conveying belt 1817 rotates in the arrow direction shown in FIG. 19. The conveying belt 1817 allows the print medium 408 adsorbed on the conveying belt 1817 to pass the area opposite to the print heads 1801 to 1808. The print heads 1801 to 1808 individually eject five types of printing materials C, M, Y, K, and S at a timing at which the print medium 408 passes the area opposite to the print heads 1801 to 1808. The print heads 1801 to 1808 eject the printing materials on the print medium 408, and the print medium 408 on which color and gloss are thus printed is separated from the conveying belt 1817 by a belt separation lug 1818 and outputted onto an output tray 1819.

A pass separation signal generating unit 1606, a pass mask generating unit 1607, and an ejection signal generating unit 1608 of the second embodiment generate signals specifying the print heads 1801 to 1808 ejecting the printing materials instead of ejection signals C",M",Y",K",S" for each pass. A pass separation signal p1 generated by the pass separation signal generating unit 1606 indicates a probability of printing a target pixel by the print head 1801, not a probability of printing the target pixel in the 1$^{st}$ pass. Likewise, pass separation signals p2 to p8 indicate probabilities of printing the target pixel by the print heads 1802 to 1808. A pass mask generated by the pass mask generating unit 1607 is a mask for determining a print head printing the target pixel. The ejection signal generating unit 1608 generates ejection signals for the print heads 1801 to 1808. The processing in an image printing processing unit 1609 of the second embodiment is performed by the image printing unit 1800. Descriptions of other features and the image printing procedure will be omitted since they are the same as those in the first embodiment.

As described above, the image printing apparatus 1 of the present embodiment has a plurality of print heads and generates an ejection signal for each print head based on the obtained anisotropy information. According to the above feature, the image printing apparatus 1 of the present embodiment can print an image reproducing high anisotropy.

[Other Embodiments]

In the above embodiments, information specifying an azimuth angle φ at which a reflection intensity of specular reflected light corresponding to incident light becomes a maximum and information specifying degrees of scattering near the specular reflection direction in a φ direction and a direction orthogonal to φ are set as anisotropy information. However, the configuration of the anisotropy information is not limited to the above. For example, the anisotropy information may be information including reflection intensities of a plurality of specular reflected lights or may be information on a plurality of gloss mappings or information including a plurality of reflection hazes. A reflection intensity of specular reflected light may be a 20-degree specular reflection glossiness, a 60-degree specular reflection glossiness, or other angles. The anisotropy information is not limited to an azimuth angle at which a reflection intensity of specular reflected light becomes a maximum and a direction orthogonal to the azimuth angle. For example, the anisotropy information may be information on 360 degrees azimuth by 1 degree. The anisotropy information may also be a value by a BRDF (bidirectional reflectance distribution function) which samples a direction of light and an observation direction with respect to a predetermined azimuth angle and an elevation angle. In the embodiments, a description has been given of the configuration of printing an image by moving the print head relative to the print medium, but a configuration of printing an image by moving the print medium relative to the print head may also be used.

In the embodiments, a description has been given of the configuration of not applying the control of a time difference between ejections of a printing material to a roughness forming material, but the control may be applied to the roughness forming material. For example, in the case of forming a roughness shape with different radii of curvature between directions, a plurality of passes are designed to print each layer of a laminate structure, and pass separation is performed so that a longer axial direction of an area printed in the same pass matches with a direction with a smaller radius of curvature. According to the above feature, roughness in the direction with a smaller radius of curvature decreases, and roughness in the direction with a larger radius of curvature increases, allowing reproduction of higher anisotropy.

The present invention can also be applied to an image printing apparatus not having a function of forming a structure having a roughness shape. In this case, color and gloss are printed on a print medium on which a structure having a roughness shape is formed in advance, by controlling a time difference between ejections of a printing material based on anisotropy information. Alternatively, without forming a structure having a roughness shape, anisotropy may be reproduced only by printing color and gloss on which control is performed of a time difference between ejections of a printing material. The number of passes, the number of lamination, the size of a pass separation pattern, a patch shape, and the like are not limited to the configurations of the embodiments. The types of printing materials are not limited to the configurations of the embodiments, either. The present invention may have light color inks or special colors such as metallic, red, green, and light orange.

In the embodiments, a description has been given of the configuration in which the host performs processing until generation of an ejection signal and the image printing unit performs printing processing based on the ejection signal, but the share of the processing steps is not limited to this. The host may perform processing until the processing of calculating signals C,M,Y,K,S specifying amounts of printing materials by the printing material separation unit 1604, and the image printing apparatus may perform the pass mask generation processing and the halftone processing, and the processing thereafter. Alternatively, the image printing apparatus may perform all kinds of processing. The processing of the color/gloss conversion unit 1603 or the processing of the printing material separation unit 1604 may be changed according to shape data generated in the shape data generating unit 1602. For example, depending on the shape data, the color conversion table and the color separation table may be switched, or an output signal may be corrected depending on the shape data. According to the above configurations, an influence of shape on change in color and gloss may be suppressed.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to provide image data representing an image which reproduces higher anisotropy as compared to a conventional method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-123012, filed Jun. 18, 2015, which is hereby incorporated by reference herein in its entirety.

What is claimed is:

1. An image processing apparatus for generating image data representing an image which reproduces anisotropy, wherein a degree of scattering of surface reflected light from the image changes depending on a direction in an image plane, the image processing apparatus comprising:
   a receiving unit configured to receive an input of image data having anisotropy information;
   an obtaining unit configured to obtain, from the anisotropy information of the input image data, information regarding a first reflection intensity of specular reflected light in a first direction in the image plane and a second reflection intensity of specular reflected light in a second direction in the image plane different from the first direction; and
   a generating unit configured to generate a signal corresponding to ejecting an ink as a printing material on a print medium based on the obtained information,
   wherein the generating unit is configured to generate the signal differentiating, based on the obtained information, a time difference between elections of the printing material for arranging pixels adjacently in the first direction on the print medium from a time difference between elections of the printing material for arranging pixels adjacently in the second direction on the print medium, and
   wherein the time difference between elections of the printing material for arranging pixels adjacently is set to be equal to or less than a threshold to form a smooth area for reducing scattering in the arranging direction and the time difference between ejections of the printing material for arranging pixels adjacently is set greater than the threshold to form fine roughness for increasing scattering in the arranging direction.

2. The image processing apparatus according to claim 1, where the image comprises a first area and a second area having different anisotropy information.

3. The image processing apparatus according to claim 1, wherein the generating unit is configured to generate the signal so that a difference between a width of an area in a longer direction and a width of the area in a shorter direction of the smooth area increases as a difference between the first reflection intensity of specular reflected light and the second reflection intensity of specular reflected light indicated by the anisotropy information increases.

4. The image processing apparatus according to claim 1, wherein the smooth area is formed by the printing material ejected in a same scanning of a print head.

5. The image processing apparatus according to claim 1, further comprising a determination unit configured to determine a longitudinal direction of the smooth area based on the anisotropy information.

6. The image processing apparatus according to claim 1, wherein the smooth area is formed by a specific type of printing material.

7. The image processing apparatus according to claim 1, wherein the smooth area is formed by a printing material printed on a surface layer of the image.

8. The image processing apparatus according to claim 1, further comprising a receiving unit configured to receive a printing condition setting,
   wherein the generating unit is configured to generate a signal corresponding to a printing material based on the anisotropy information and the printing condition.

9. The image processing apparatus according to claim 1, further comprising a shape data generating unit configured to generate shape data based on the anisotropy information,
   wherein the shape data generating unit is configured to generate the shape data so that a cross section of a first structure formed in the first direction and a cross section of a second structure formed in the second direction have different reflection intensities corresponding to incident light depending on the direction.

10. The image processing apparatus according to claim 9, further comprising a printing unit configured to print the image by forming the structure on the print medium based on the shape data and ejecting the printing material on an upper surface of the structure based on the signal.

11. The image processing apparatus according to claim 1, wherein the anisotropy information includes information specifying:
   an azimuth angle at which a reflection intensity of specular reflected light corresponding to incident light becomes a maximum,
   a first specular reflection intensity being the reflection intensity of the specular reflected light at the azimuth angle,
   a first reflection haze being a reflection intensity of diffused light near the specular reflected light direction at the azimuth angle,
   a second specular reflection intensity being the reflection intensity of the specular reflected light corresponding to the incident light at a second angle different from the azimuth angle, and
   a second reflection haze being a reflection intensity of diffused light near the specular reflected light direction at the second angle.

12. The image processing apparatus according to claim 1, wherein the anisotropy information includes information specifying a plurality of gloss mappings.

13. The image processing apparatus according to claim 1, wherein the anisotropy information includes information specifying a BRDF.

14. The image processing apparatus according to claim 1, further comprising a printing unit configured to print the image by ejecting the printing material on the print medium based on the signal.

15. An image processing method of generating image data representing an image which reproduces anisotropy, wherein a degree of scattering of surface reflected light from the image changes depending on a direction in an image plane, the image processing method comprising:
   receiving an input of image data having anisotropy information;
   obtaining, from the anisotropy information of the input image data, information regarding a first reflection intensity of specular reflected light in a first direction in the image plane and a second reflection intensity of specular reflection light in a second direction in the image plane different from the first direction; and generating a signal corresponding to ejecting an ink as a printing material on a print medium based on the obtained information, wherein in the generating step, the signal is generated to differentiate, based on the obtained information, a time difference between ejections of the printing material for arranging pixels adjacently in the first direction on the print medium from a time difference between ejections of the printing material for arranging pixels adjacently in the second direction on the print medium, and wherein the time difference between elections of the printing material for arranging pixels adjacently is set to be equal to or less than a threshold to form a smooth area for reducing scattering in the arranging direction and the time difference between elections of the printing material for arranging pixels adjacently is set greater than the threshold to form fine roughness for increasing scattering in the arranging direction.

16. A non-transitory computer readable storage medium storing a program for causing a computer to execute a method of controlling an image processing apparatus for generating image data representing an image which reproduces anisotropy, wherein a degree of scattering of surface reflected light from the image changes depending on a direction in an image plane, the method comprising:

receiving an input of image data having anisotropy information;

obtaining, from the anisotropy information of the input image data, information regarding a first reflection intensity of specular reflected light in a first direction in the image plane and a second reflection intensity of specular reflection light in a second direction in the image plane different from the first direction; and generating a signal corresponding to ejecting an ink as a printing material on a print medium based on the obtained information, wherein in the generating step, the signal is generated to differentiate, based on the obtained information, a time difference between ejections of the printing material for arranging pixels adjacently in the first direction on the print medium from a time difference between ejections of the printing material for arranging pixels adjacently in the second direction on the print medium, and wherein the time difference between ejections of the printing material for arranging pixels adjacently is set to be equal to or less than a threshold to form a smooth area for reducing scattering in the arranging direction and the time difference between ejections of the printing material for arranging pixels adjacently is set greater than the threshold to form fine roughness for increasing scattering in the arranging direction.

* * * * *